(12) United States Patent
Penland, Jr. et al.

(10) Patent No.: US 9,714,487 B2
(45) Date of Patent: *Jul. 25, 2017

(54) INDUSTRIAL MATS WITH LIFTING ELEMENTS

(71) Applicant: QUALITY MAT COMPANY, Beaumont, TX (US)

(72) Inventors: Joe Penland, Jr., Beaumont, TX (US); Scott Calvert, Beaumont, TX (US)

(73) Assignee: Quality Mat Company, Beaumont, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/244,614

(22) Filed: Aug. 23, 2016

(65) Prior Publication Data
US 2016/0362847 A1  Dec. 15, 2016

Related U.S. Application Data

(63) Continuation-in-part of application No. 15/188,113, filed on Jun. 21, 2016, which is a continuation-in-part
(Continued)

(51) Int. Cl.
*E01C 9/08* (2006.01)
*E01C 5/22* (2006.01)
(Continued)

(52) U.S. Cl.
CPC .............. *E01C 9/086* (2013.01); *B32B 7/005* (2013.01); *B32B 15/095* (2013.01);
(Continued)

(58) Field of Classification Search
CPC ... E01C 9/086; E01C 9/08; E01C 5/00; E01C 11/24
See application file for complete search history.

(56) References Cited

U.S. PATENT DOCUMENTS 2,836,529 A    5/1958  Morris
3,078,621 A *  2/1963  Hinds .................. E04G 21/142
                                                        206/321
(Continued)

FOREIGN PATENT DOCUMENTS

CA    2 233 776 A1   12/1999
CA    2 637 470 A1    1/2010
(Continued)

OTHER PUBLICATIONS

Richard West Co., Inc., Steel Reinforced Crane Mat, downloaded from the internet on May 11, 2016 see http://www.richardwestcompany.com/products.html).
(Continued)

*Primary Examiner* — Abigail A Risic
(74) *Attorney, Agent, or Firm* — Winston & Strawn LLP

(57) ABSTRACT

An industrial mat having a supporting structure; an upper layer provided above the supporting structure for forming an upper surface of the mat, a lower layer provided below the supporting structure for providing a lower surface of the mat; and lifting elements attached to the upper layer, the lower layer or the supporting structure. The lifting elements include D-shaped members, O-shaped members, U-shaped members, eyelets, hooks, circular or polygonal rings, chains, or cables that are configured and dimensioned for attachment to attached to the supporting structure or the upper or lower layer with sufficient strength to provide certified overhead lifting of the mat for installation and reclamation thereof.

20 Claims, 18 Drawing Sheets

Related U.S. Application Data of application No. 15/155,685, filed on May 16, 2016, which is a continuation-in-part of application No. 15/081,340, filed on Mar. 25, 2016, now Pat. No. 9,476,164, which is a continuation-in-part of application No. 15/056,212, filed on Feb. 29, 2016, now Pat. No. 9,447,547, which is a continuation-in-part of application No. 14/839,888, filed on Aug. 28, 2015, now Pat. No. 9,315,949, application No. 15/244,614, which is a continuation-in-part of application No. 15/081,340, filed on Mar. 25, 2016, now Pat. No. 9,476,164, and a continuation-in-part of application No. 15/056,212, filed on Feb. 29, 2016, now Pat. No. 9,447,547.

(60) Provisional application No. 62/054,186, filed on Sep. 23, 2014, provisional application No. 62/138,143, filed on Mar. 25, 2015, provisional application No. 62/158,196, filed on May 7, 2015, provisional application No. 62/211,664, filed on Aug. 28, 2015.

(51) Int. Cl.
| | | |
|---|---|---|
| *B32B 7/00* | (2006.01) | |
| *E01C 5/00* | (2006.01) | |
| *B32B 15/095* | (2006.01) | |
| *B32B 21/04* | (2006.01) | |
| *B32B 21/12* | (2006.01) | |
| *B32B 27/08* | (2006.01) | |

(52) U.S. Cl.
CPC ............ *B32B 21/045* (2013.01); *B32B 21/12* (2013.01); *B32B 27/08* (2013.01); *E01C 5/006* (2013.01); *E01C 5/22* (2013.01); *B32B 2307/712* (2013.01); *B32B 2471/04* (2013.01); *E01C 2201/10* (2013.01); *E01C 2201/12* (2013.01)

(56) References Cited

U.S. PATENT DOCUMENTS

| | | |
|---|---|---|
| 3,985,169 A | 10/1976 | Chow |
| 4,324,037 A | 4/1982 | Grady, II |
| 4,462,712 A | 7/1984 | Penland, Sr. |
| 4,600,336 A * | 7/1986 | Waller, Jr. ............... E01C 9/086 404/35 |
| 4,629,358 A | 12/1986 | Springston et al. |
| 4,875,800 A | 10/1989 | Hicks |
| 4,889,444 A | 12/1989 | Pouyer |
| 4,932,178 A | 6/1990 | Mozingo |
| 5,020,937 A | 6/1991 | Pouyer |
| 5,032,037 A | 7/1991 | Phillips |
| 5,050,366 A | 9/1991 | Gardner et al. |
| 5,113,632 A | 5/1992 | Hanson |
| 5,139,845 A | 8/1992 | Beckerman et al. |
| 5,163,776 A | 11/1992 | Pouyer |
| 5,241,163 A | 8/1993 | Vachtsevanos et al. |
| 5,273,373 A | 12/1993 | Pouyer |
| 5,342,260 A | 8/1994 | Markland |
| 5,402,609 A | 4/1995 | Kelley, Jr. |
| 5,535,694 A | 7/1996 | Czipri |
| 5,653,551 A | 8/1997 | Seaux |
| 5,679,191 A | 10/1997 | Robinson |
| 5,822,944 A | 10/1998 | Penland, Sr. |
| 5,888,612 A | 3/1999 | Needham et al. |
| 5,930,967 A | 8/1999 | Stoehr et al. |
| 5,985,415 A | 11/1999 | Giltner |
| 6,007,271 A | 12/1999 | Cole et al. |
| 6,023,900 A | 2/2000 | Stoehr et al. |
| 6,214,428 B1 | 4/2001 | Henderson |
| 6,231,950 B1 | 5/2001 | Giltner |
| 6,231,994 B1 | 5/2001 | Totten |
| 6,365,650 B1 | 4/2002 | Chen et al. |
| 6,380,309 B1 | 4/2002 | Parker et al. |
| 6,450,235 B1 | 9/2002 | Lee |
| 6,474,905 B1 | 11/2002 | Smith, Jr. |
| 6,497,956 B1 | 12/2002 | Phillips et al. |
| 6,511,257 B1 | 1/2003 | Seaux et al. |
| 6,649,110 B1 | 11/2003 | Seaux et al. |
| 6,662,508 B1 | 12/2003 | Else |
| 6,695,527 B2 | 2/2004 | Seaux et al. |
| 6,722,831 B2 | 4/2004 | Rogers |
| 6,763,873 B2 | 7/2004 | Lee |
| 6,821,623 B2 | 11/2004 | Kvesic |
| 6,945,732 B2 | 9/2005 | Renick |
| 7,137,226 B2 | 11/2006 | Fiutak et al. |
| 7,303,800 B2 | 12/2007 | Rogers |
| 7,404,690 B2 | 7/2008 | Lukasik et al. |
| 7,413,374 B2 | 8/2008 | Rogers et al. |
| 7,427,172 B2 | 9/2008 | Lukasik |
| D609,956 S | 2/2010 | Lukasik |
| 7,818,929 B2 | 10/2010 | Fiutak et al. |
| 7,934,885 B2 | 5/2011 | Fournier |
| 8,061,929 B2 | 11/2011 | Dagesse |
| 8,070,004 B2 | 12/2011 | Williams et al. |
| 8,088,477 B2 | 1/2012 | Curtis et al. |
| 8,382,393 B1 | 2/2013 | Phillips |
| 8,424,577 B2 | 4/2013 | Poutanen |
| 8,613,373 B2 | 12/2013 | Holtby et al. |
| 8,734,263 B2 | 5/2014 | Ford et al. |
| 8,784,001 B1 | 7/2014 | Phillips |
| 8,857,125 B2 | 10/2014 | Lu et al. |
| 8,906,480 B2 | 12/2014 | Fiutak et al. |
| 8,936,073 B1 | 1/2015 | Phillips |
| 9,133,598 B2 | 9/2015 | Hsu |
| 9,347,184 B2 | 5/2016 | Evelyn |
| 2002/0110418 A1 | 8/2002 | Renick |
| 2004/0037644 A1 | 2/2004 | Renick |
| 2004/0071914 A1 | 4/2004 | Fiutak et al. |
| 2004/0253055 A1 | 12/2004 | Polivka, Jr. |
| 2005/0022363 A1 | 2/2005 | Harrison |
| 2006/0034654 A1 | 2/2006 | Sanders |
| 2006/0179733 A1 | 8/2006 | Padmanabhan |
| 2006/0265976 A1 | 11/2006 | Fiutak et al. |
| 2007/0056228 A1 | 3/2007 | Penland, Sr. et al. |
| 2007/0237581 A1 | 10/2007 | Lukasik et al. |
| 2008/0028703 A1 | 2/2008 | Brandstrom |
| 2008/0085154 A1 | 4/2008 | Lukasik |
| 2008/0152861 A1 | 6/2008 | Barker |
| 2008/0292397 A1 | 11/2008 | Farney et al. |
| 2009/0087261 A1 | 4/2009 | Fournier |
| 2009/0301004 A1 | 12/2009 | Dagesse |
| 2011/0233363 A1 | 9/2011 | Wold |
| 2011/0280657 A1 | 11/2011 | Martinez |
| 2012/0063844 A1 | 3/2012 | Wold |
| 2013/0284872 A1 | 10/2013 | Tubbs |
| 2013/0306804 A1 | 11/2013 | Holtby et al. |
| 2013/0318896 A1 | 12/2013 | Rogers |
| 2014/0154462 A1 | 6/2014 | Fiutak et al. |
| 2014/0183319 A1 | 7/2014 | Tubbs |
| 2014/0186573 A1 | 7/2014 | Tubbs |
| 2014/0193196 A1 | 7/2014 | Fournier |
| 2014/0199119 A1 | 7/2014 | Stasiewich |
| 2014/0205377 A1 | 7/2014 | Hill |
| 2014/0341649 A1 | 11/2014 | Bryan et al. |

FOREIGN PATENT DOCUMENTS

| | | |
|---|---|---|
| EP | 1 600 558 A1 | 11/2005 |
| EP | 2 705 950 A1 | 3/2014 |
| WO | 95/25076 A1 | 9/1995 |
| WO | 2006/002507 A1 | 1/2006 |
| WO | 2006/048654 A1 | 5/2006 |
| WO | 2007/112537 A1 | 10/2007 |

OTHER PUBLICATIONS

Forest Products Laboratory. Wood Handbook—Wood as an Engineering Material—4. Mechanical Properties of Wood. U.S. Department of Agriculture. Online version available at: app.knovel.com/

(56) References Cited

OTHER PUBLICATIONS hotlink/pdf/id:kt0052LP04/wood-handbook-wood-an/mechanical-properties (1999).
"Inflammable". Wiktionary. Archived Sep. 6, 2014.
International Search Report and Written Opinion, Appl. No. PCT/US2016/020081, Jun. 2, 2016.
International Search Report and Written Opinion, Appl. No. PCT/US2016/020067, Aug. 8, 2016.
U.S. Appl. No. 15/056,212, Notice of Allowability, Aug. 11, 2016.
U.S. Appl. No. 15/081,340, Notice of Allowability, Sep. 1, 2016.
U.S. Appl. No. 15/240,171, Non-Final Rejection, Dec. 20, 2016.
U.S. Appl. No. 14/839,888, Non-Final Rejection, Nov. 6, 2015.
U.S. Appl. No. 14/839,888, Notice of Allowance, Jan. 14, 2016.
U.S. Appl. No. 14/839,888, Notice of Allowability, Feb. 19, 2016.
U.S. Appl. No. 14/839,900, Non-Final Rejection, Oct. 29, 2015.
U.S. Appl. No. 14/839,900, Notice of Allowance, Jan. 20, 2016.
U.S. Appl. No. 14/855,336, Non-Final Rejection, Feb. 9, 2016.
U.S. Appl. No. 15/056,212, Non-Final Rejection, Apr. 22, 2016.
U.S. Appl. No. 15/056,212, Notice of Allowance, Jun. 9, 2016.
U.S. Appl. No. 15/081,340, Non-Final Rejection, May 6, 2016.
U.S. Appl. No. 15/081,340, Notice of Allowance, Jun. 15, 2016.
Invitation to Pay Additional Fees, Appl. No. PCT/US2016/020067, Jun. 20, 2016.
"Crane Mat", retrieved from http://www.qmat.com/products/crane-mats/ (2015).

\* cited by examiner

INDUSTRIAL MATS WITH LIFTING ELEMENTS

CROSS-REFERENCE TO RELATED APPLICATIONS

This application is a continuation-in-part of application Ser. No. 15/188,113 filed Jun. 21, 2016, which in turn is a continuation-in-part of application Ser. No. 15/155,685 filed May 16, 2016, which in turn is a continuation-in-part of application Ser. No. 15/081,340 filed Mar. 25, 2016, which in turn is a continuation-in-part of application Ser. No. 15/056,212 filed Feb. 29, 2016, which in turn is a continuation-in-part of application Ser. No. 14/839,888 filed Aug. 28, 2015, now U.S. Pat. No. 9,315,949, which claims the benefit of each of application No. 62/054,186 filed Sep. 23, 2014, application No. 62/138,143 filed Mar. 25, 2015, and 62/158,196 filed May 7, 2015.

This application is also a continuation-in-part of each of application Ser. No. 15/081,340 filed Mar. 25, 2016, and Ser. No. 15/056,212 filed Feb. 29, 2016.

This application also claims the benefit of application No. 62/211,664 filed Aug. 28, 2015.

The entire content of each of the foregoing applications is expressly incorporated herein by reference thereto.

BACKGROUND

The present invention relates to an industrial mat for use in construction sites that require heavy lifting, crane support stabilization, temporary areas for installation of pipelines or bridges, and other support structures in locations where the ground requires grading and stabilization to provide a flat support surface for such equipment or activities.

Conventional industrial mats are typically 4 feet wide and utilize beams having square or rectangular cross sections of sizes between 8×8 inch to 16×16 inch that are up to 40 feet in length. Typically, the beams are made of oak and preferably white oak as that material provides acceptable performance of the mats for a significant service life at a reasonable cost. Such mats are available from Quality Mat Company, Beaumont, Tex. These mats, which are often called timber mats or crane mats, typically utilize virgin wood that is shaped and cut to length to meet design demands. Due to weather conditions and other environmental factors, however, the availability of trees that can be harvested to make such large size and length beams is reduced, thus making it difficult to obtain suitable quantities to make large numbers of mats.

Accordingly, alternatives are needed for industrial mat constructions to conserve the amount of wood beams that need to be included. Also, the materials that may be considered as alternatives need to possess the necessary physical properties to be able to withstand harsh outdoor conditions as well as to support heavy equipment. And of course cost is a factor in determining the selection of alternate materials, as it is not cost-effective to provide a mat that is multiple times more expensive than one that can be made of wood.

Additionally, there are concerns regarding the lifting and movement of such mats. In the past, lifting, manipulation and placement of the mats were facilitated by exposing part of the joining member for grasping by a lifting hook of a crane or other heavy piece of equipment. While the exposure of the joining or connecting rod facilitated lifting or moving operations, it presented an issue in that workers could inadvertently step into over the open hole that was provided around the connecting rod. Thus, other designs are needed to provide more safely to personnel working on these mats.

The present invention now satisfies this need in the art for such alternative constructions by providing newly designed industrial mats that exhibit improved performance over total wood mats at a competitive cost. These new mats also include improved structures and arrangements for lifting and manipulation of the mats. The new mats also avoid the reliance upon long wood beams for the entire mat construction as in the past.

SUMMARY OF THE INVENTION

The invention relates to a crane mat comprising a plurality of a plurality of longitudinal beams that are positioned in a side by side arrangement; each of the beams having a plurality of spaced lateral apertures passing therethrough, with the lateral apertures being in alignment to form bores through the mat; a plurality of lateral rods with each rod passing through each beam through the aligned lateral apertures to hold the beams together in the side by side arrangement; and at least two lifting elements each located in an opening in one of the beams, each lifting element having a body with a first end thereof connected to a lateral rod and a second end having grasping means for allowing a hook or connecting element of equipment to engage the grasping means for lifting and manipulation of the mat, with the opening configured and dimensioned to hold and maintain the lifting element therein in a first retracted position when not in use and to allow retrieval and removal of the second end of the lifting element from the opening to a second position that exposes the grasping means when the mat is to be lifted or manipulated.

The first end of the lifting element generally includes a first aperture in the body which is configured and dimensioned to receive the lateral rod to allow the lateral rod to pass through the first aperture to attach the lifting element to the lateral rod, and the second end of the lifting element generally includes a second aperture in the body which is configured and dimensioned to receive the hook or connecting element when removed from the opening and placed in the second position.

The body of the lifting element is typically elongated and the first and second ends are arcuate to allow rotational movement of the second end about the lateral rod when the second end is to be removed from the opening. Also, the opening is sufficiently large to provide space around or access to the lifting element to allow a user to grab the second end to rotate it about the lateral rod and out of the opening.

The invention also relates to a crane mat of the type described herein wherein the lifting element comprises a chain or cable that is attached to or passes around a lateral rod and has a portion that can be retrieved from the surrounding opening to allow for temporary connection to a hook or connecting element of equipment for lifting and manipulation of the mat, with the mat opening configured and dimensioned to hold and maintain the lifting element therein in a first retracted position when not in use and to allow retrieval and removal of the lifting element portion from the opening to a second position that exposes the lifting element portion when the mat is to be lifted or manipulated.

Advantageously, one lifting element is located on a lateral rod nearest one end of the mat and another lifting element is located on a lateral rod nearest the opposite end of the mat. In any of these embodiments, however, the openings for the lifting element may also be spaced about 1 to 3 feet from the front or rear ends of the mat rather than be provided at the end or ends of the mat.

In a crane mat, the beams have a width by height dimensions of between about 6 by 6 inches to about 24 by 24 inches and a length of between about 4 and about 60 feet, and are made of wood, engineered wood, or a thermosetting plastic material. Typically, between 4 and 16 beams are present in the mat. If desired, the mat can include metal plates located between one or more pairs (or between all pairs) of beams with the metal plates being essentially the same height and length as the beams.

In another embodiment, the invention provides an industrial mat comprising a supporting structure that is configured and arranged to provide strength and rigidity to the mat and to support other components of the mat; an upper layer provided above the supporting structure for forming an upper surface of the mat, a lower layer provided below the supporting structure for providing a lower surface of the mat; and lifting elements attached to the upper layer, the lower layer or the supporting structure, with the lifting elements comprising D-shaped members, O-shaped members, U-shaped members, eyelets, hooks, circular or polygonal rings, chains, or cables that are configured and dimensioned for attachment to attached to the supporting structure or the upper or lower layer with sufficient strength to provide certified overhead lifting of the mat for installation and reclamation thereof; wherein the supporting structure includes at least two longitudinal members forming sides of the mat; and wherein upper and lower layers are independently made of a plate, sheet or plurality of elongated members.

The lifting element may be directly attached to the upper or lower layer or to a connecting member that is attached to the side longitudinal members of the supporting structure, wherein the connecting member comprises a plate, tube or rod, and the mat has a width of between about 4 and about 8 feet, a height of about 6 inches to about 24 inches and a length of between about 4 and about 60 feet.

The supporting structure preferably comprises first and second longitudinal members of steel or a reinforced thermosetting resin that are joined together by a plurality of cross members to form a frame, with the lifting elements directly connected to the frame. And preferred lifting elements comprise D-, O- or U-shaped members or rings that are attached directly to a cross member of the supporting structure; or chains or cables that pass through openings in the upper or lower layers of the mat, with the openings optionally reinforced with collars which protect the openings from contact by the chains or cables and which adds stability as the mat is being hoisted or moved.

The lifting elements can also include one or two U-shaped members operatively associated with a rod that passes through the mat and that includes a plate attached thereto, with the lifting element including a spring between the plate and the U-shaped member and with the rod having a U-shaped member on one or each end, wherein when two U-shaped members are present, two springs are also present, one between each U-shaped member and the plate.

Advantageously, the lifting elements include at least two lifting elements each located in an opening in the mat, each lifting element having a body with a first end thereof connected to one of: the upper or lower layers, the side longitudinal members, or to a connecting member that is attached to the side longitudinal members of the supporting structure, and a second end having grasping means for allowing a hook or connecting element of equipment to engage the grasping means for lifting and manipulation of the mat, with the mat including an opening configured and dimensioned to hold and maintain the lifting element therein in a first retracted position when not in use and to allow retrieval and removal of the second end of the lifting element from the opening to a second position that exposes the grasping means when the mat is to be lifted or manipulated. The body of the lifting element is preferably elongated and the first and second ends are arcuate to the second end to be removed from the opening, wherein the opening is sufficiently large to provide space around or access to the lifting element to allow a user to grab the second end to move it out of the opening.

Another embodiment of the invention is an industrial mat having substantially flat top and bottom surfaces and comprising first and second side beams having top, side, and bottom surfaces, with the beams having width and height dimensions of between about 6×6 inches and about 24×24 inches and a length of between about 4 and 60 feet; a support structure located between and connecting the first and second side beams, with the support structure comprising first and second longitudinal members; wherein the side beams are attached to the support structure; and a mat lifting element associated with at least one opening in the mat to facilitate lifting or movement of the mat. The lifting element may be one of the lifting elements disclosed herein, and typically comprises D-shaped members, O-shaped members, U-shaped members, eyelets, hooks, circular or polygonal rings, chains, or cables having sufficient strength to provide certified overhead lifting of the mat for installation and reclamation thereof.

The support structure also may include a first plurality of elongated members attached to an upper portion of the support structure to form the top surface of the mat; and a second plurality of elongated members attached to a lower portion of the support structure to form the bottom surface of the mat, wherein each opening is present in one of the first or second elongated members or between two of such members and is configured and dimensioned to provide a minimum of open space. Each opening is associated with a lifting element or a portion thereof and preferably includes a collar which protects the opening from contacting a lifting element and which adds stability the mat is being hoisted or moved.

The invention also relates to industrial mats having substantially flat top and bottom surfaces and comprising first and second side beams having top, side, and bottom surfaces, a non-wood support structure located between and connecting the first and second side beams, a plurality of joining rods that attach the side beams to the support structure, and elongated members attached to the upper and lower portions of the support structure.

The joining rods pass through the sides of the beams and support structure, with the rods spaced about 2 to 6 feet apart, to hold the mat securely together. These mats may include one or more openings in an elongated member to provide access to a joining rod for lifting or other manipulation of the mats.

The support structure provides strength and helps holds the mat components together. The support structure has upper, lower and side portions, a height that is less than that of the side beams, a width and a length, with the support structure comprising first and second longitudinal members that are joined together by a plurality of cross members spaced about 10 to 30 inches apart. The cross members provide rigidity to the mat and resistance to torsional forces that the mat will encounter when being transported, installed and when in service. Preferably, the first and second longitudinal members are configured as a flat plate or a C-shaped beam and the cross members are configured as a flat plate, and I-beam or a C-shaped beam.

In the support structure, the first and second longitudinal members and plurality of cross members of the support structure form a frame. Generally, the longitudinal members of the support structure have a length that is less than that of the side beams, and the mat further comprises bumper members that are joined to the support structure to form the front and rear ends of the mat between the first and second beams.

A first plurality of elongated members is attached to the upper portion of the support structure, while a second plurality of elongated members is attached to the lower portion of the support structure. Thus, the top surface of the mat is formed by the top surfaces of at least one or both of the beams and the first plurality of elongated members, while the bottom surface of the mat is formed by the bottom surfaces of at least one or both the beams and the second plurality of elongated members. This enables the mat to provide a secure base when placed on prepared ground (e.g., terrain that is leveled and provided with a crushed stone base of 4 inches for 8 inch thick mats and 8 inches for 12 inch thick mats).

In particular, the invention relates to a crane or timber mat having substantially flat top and bottom surfaces and comprising first and second side beams having top, side, and bottom surfaces, with the beams having width and height dimensions of between about 6×6 inches and about 24×24 inches and a length of between about 18 and 60 feet; a non-wood support structure located between and connecting the first and second side beams, with the support structure having upper, lower and side portions, a height that is less than that of the side beams, a width and a length, with the support structure comprising first and second longitudinal members that are joined together by a plurality of cross members spaced about 10 to 30 inches apart; a plurality of joining rods that attach the side beams to the support structure, with the joining rods passing through the sides of the beams and support structure, with the rods spaced about 3 to 6 feet apart; a first plurality of elongated members attached to the upper portion of the support structure; and a second plurality of elongated members attached to the lower portion of the support structure. The top surface of the mat is formed by the top surfaces of the beams and the first plurality of elongated members, and the bottom surface of the mat is formed by the bottom surfaces of one or both of the beams and the second plurality of elongated members.

The mat preferably includes beams having square or rectangular cross-sections and width and height dimensions of between about 8×8 inches and about 20×24 inches and lengths of between about 10 and 40 feet. The support structure is configured to have a height that is about 3 to 6 inches less than that of the beams. This provides space at the top and bottom of the support structure to receive elongated members to provide the substantially flat surfaces on the top and bottom of the mat.

In one embodiment, each side beam has the same dimensions and the side beams are attached to the support structure to locate their upper surfaces about 1.5 to 3 inches above the support structure and to locate their lower surfaces about 1.5 to 3 inches below the support structure. The elongated members preferably have a corresponding thickness of about 1.5 to 3 inches. This arrangement allows the placement of the first plurality of elongated members on top of the support structure and the second plurality of elongated members on the bottom of the support structure to provide the substantially flat upper and lower surfaces of the mat.

For these embodiments, the first and second plurality of elongated members have the same thickness and are typically bolted to the support structure to form those surfaces. The joining rods each comprises a bolt and nut arrangement wherein the bolts pass through a central area of the side beams and the longitudinal members of the support structure and is secured in place by the nuts. Furthermore, some of the first and second plurality of elongated members have one or more openings to provide access to one or more joining rods to facilitate lifting or manipulation of the mat. Also, the first and second plurality of elongated members have a thickness of about 1.5 to 3 inches so that they can provide flat surfaces on the top and bottom of the mat adjacent the side beams. The mat preferably has a load bearing capacity that is able to withstand a load of at least 500 to 800 psi to as much as 1000 psi without permanently deforming the support structure.

In an alternative embodiment, the first side beam is sized to provide about one half the height of the mat, with the first side beam attached to an upper portion of the support structure such that the upper surface of the first side beam extends above the support structure by about 1.5 to 3 inches. The second side beam is also sized to provide about one half the height of the mat and is attached to the second side of the support structure in a lower position such that the lower surface of the second side beam extends below the support structure by about 1.5 to 3 inches.

For this embodiment, the joining rods preferably comprises a bolt and nut arrangement that passes through a central area of the side beams and support structure, with the bolts passing through the first beam connected to an upper portion of the first longitudinal member of the support structure, and with the bolts passing through the second beam connected to a lower portion of the second longitudinal member of the support structure. The resulting "stepped" structure of the side beams allows the quick and easy installation of the mats in an interlocking configuration wherein the first side beam of one mat sits upon the second side beam of an adjacent mat to form an interlocked structure of conjoined mats to form a working base. And as above, the first and second elongated members have a thickness of about 1.5 to 3 inches to assist in forming the substantially flat upper and lower surfaces of the mat.

In a further embodiment of the interlocking mats, modified mats are provided with a first side beam being a half-size beam as described in the previous paragraph, and with a second side beam sized to provide the full height of the mat, such that the mat can provide an outermost mat of an interlocked structure of conjoined mats wherein the outermost size of the mad is fully stabilized without any stepped portions or areas. As in the other embodiments, the upper surface of the second side beam extends above the support structure by about 1.5 to 3 inches and the lower surface of the second side beam extends below the support structure by about 1.5 to 3 inches so that the adjacent areas can receive elongated members having a thickness of about 1.5 to 3 inches to provide substantially flat upper and lower surfaces for the mat.

Alternatively, to stabilize the outermost sides of the interlocked mats, additional first beams of the same dimensions as the first beam can be provided for placement below the first side beams of the outmost first mats. Similarly, additional second side beams of the same dimensions as the second beams are provided for placement upon the second side beams of other outermost mats. These additional beams allow the entire upper and lower conjoined mat surfaces to be substantially flat with the outermost sides of the conjoined structure stabilized to support equipment or to allow vehicles to drive onto the conjoined mat structure.

For any of the preceding embodiments, a number of preferred features are provided. The mat preferably includes the first and second longitudinal members as C-shaped beams in order to provide flat faces for contact with the side beams. The side beams are typically made of solid cut wood, engineered lumber or a thermosetting plastic, generally as a pultrusion. Similarly, the plurality of elongated members are boards made of solid cut wood, engineered lumber or a thermosetting plastic pultrusion.

The mats of the invention typically have a width of between about 4 and 8 feet, with the support structure having a width that is about 2 to 8 times the width of one side beam and the mat having a width of about 4 to 12 times the width of one side beam.

In another embodiment, the first and second side beams are sized to provide about one half the height of the mat, with the first side beam attached to the first side of the support structure in a raised position such that the upper surface of the first side beam extends above the support structure by about 1.5 to 3 inches, and with the second side beam attached to the second side of the support structure in a lowered position such that the lower surface of the second side beam extends below the support structure by about 1.5 to 3 inches. This arrangement allows adjacent mats to be interlocked together. In particular, the first side beam of one mat will sit upon the second side beam of an adjacent mat to form an interlocked structure of conjoined mats.

In a further embodiment, the invention relates to a non-wood mat having the components and structures disclosed herein, wherein the first and second longitudinal members are metal beams that provide flat faces for contact with the side beams; the side beams are made of a thermosetting plastic; the plurality of elongated members are boards made of a thermosetting plastic and are bolted to the support structure; and the joining rods each comprises a bolt and nut arrangement wherein the bolts are made of high strength steel and pass through a central area of the side beams and the longitudinal members of the support structure and is secured in place by the nuts.

In yet another embodiment, these mats include one or more openings in an elongated member to provide access to a joining rod to facilitate movement or lifting of the mat without providing full exposure of a joining rod. Preferably, a mat lifting element is associated with at least one opening to facilitate lifting or movement of the mat.

Each opening of the mat is configured and dimensioned to provide a minimum of open space to avoid creating holes or other discontinuities into which a worker can stumble. In particular, the one or more openings in the elongated members includes one opening in each of two elongated members; one opening in each of four elongated members; one opening in each member; two openings in one elongated member; two openings in each of two elongated members; two openings in each of four elongated members; or two openings in each elongated member.

As noted, it is advantageous for a lifting element to be provided with each opening. In this regard, each lifting element generally comprises, a chain link, a connector ring; a hook, a D-shaped member, a U-shaped member, or a circular or polygonal ring. These elements, and in particular the chain, can be connected directly to the joining rod while other elements can be associated with or attached to another structural element that is attached to the joining rod. The preferred lifting elements include a D- or U-shaped member or a ring that is attached directly to a cross-member of the support structure or that is operatively associated with a connecting member that is attached to the support structure. For this, the connecting member comprises a plate or tube that is attached to one or more cross-members.

Another preferred the lifting element is a U-shaped member that is operatively associated with a rod that passes through the connecting member, with the lifting element including a spring between the plate and the U-shaped member. The lifting element can include two U-shaped members that are located on each end of a rod that passes through the connecting member, with two springs present, one between each U-shaped member and the connecting member.

And to protect the opening in the mat from contacting the lifting element, a collar is provided in each opening. The collar member may also be designed to be in contact with the lifting member to add stability to the assembly when the mat is being hoisted or moved.

BRIEF DESCRIPTION OF THE DRAWINGS

The nature and various advantages of the present invention will become more apparent upon consideration of the following detailed description, taken in conjunction with the accompanying drawings, in which like reference characters refer to like parts throughout, and in which:

FIG. 18 is a view of the lifting element of FIG. 15 in a position spaced from the end of the mat, while FIG. 18A illustrates the lifting element in an operative position and FIG. 18B illustrates the lifting element in a retracted position;

DETAILED DESCRIPTION OF THE INVENTION

Figure 1:
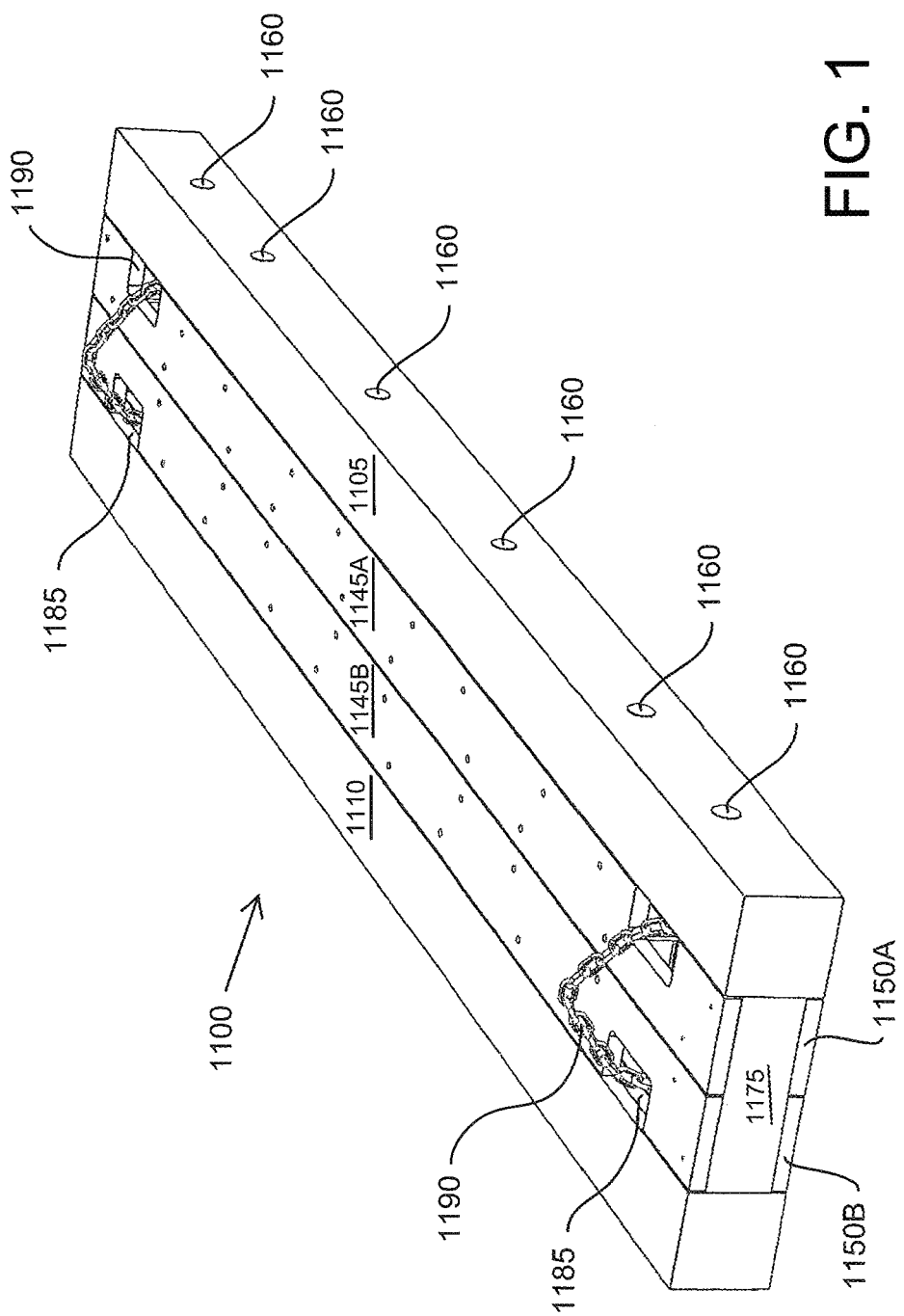
FIG. 1 is a perspective view of a first embodiment of a mat according to the present invention.

The new and improved industrial mats of the present invention now provide a number of surprising advantages over conventional mats. For one, the use of a support structure that is not made of wood conserves timber resources which would otherwise be harvested to provide the long length beans for construction of the mats. Now, only the side beams of wood are used with the support structure providing the remaining width of the mat. And in the preferred arrangements, the support structure is not of the same height as the side beams to allow other, thinner elongated members to be applied to the top and bottom of the support structure so that the upper and lower surfaces of the mat are substantially uniform. These members may be wood but shorter lengths and thinner cross sections are used.

For other embodiments, the use of fiberglass reinforced thermosetting resins, generally in the form of a pultrusion, for the side beams and elongated members essentially eliminates the use of any wood in the mats. This further conserves timber resources.

The use of a non-wood support structure enables that component to be reused in the event that the side beams or elongated members become damaged or experience deterioration due to use and exposure to harsh environmental conditions. By being made of more robust and environmentally resistant materials, it is possible to disconnect the joining rods to take apart the mats and remove the damaged side beams or elongated members, and then add new components to the structure to form a new mat. In effect, this reduces the demand for wood beams or elongated members by 50 to as much as 100%.

Certain terms that are used herein are defined hereinbelow to assist in the understanding of the invention.

The term "industrial mat" is intended to cover relatively large mats having widths of at least about 4 feet with lengths running from about 4 feet to 40 feet and incorporating elongated members, beams, or other components having square or rectangular cross sections of sizes of at least about 6×6 to 24×24 inches with lengths from about 4 feet to as much as 40 feet or more. Preferred dimensions are described throughout the specification. As noted, previous and current mats of this type that are commercially available are primarily constructed of monolithic wood.

The term "non-wood" to describe the support structure is used for its ordinary meaning. The components of the structure are generally not made of wood but instead are made of metal, a thermosetting plastic or other materials that are resistant to degradation due to environmental factors such as moisture from water, snow or ice, organisms that can cause wood rot, or similar external factors that affect wood.

The term "substantially" is used for its ordinary meaning to indicate that the dimensions are not precise or exact. A skilled artisan can readily determine what tolerances are acceptable to provide a surface that is considered to be flat based upon the size of the side beams and the type of service that the mat is expected to provide. There is no requirement that the beams and elongated members be flush with each other along the top and bottom surfaces of the mat. Typically, the term "substantially" will mean that the top surfaces of the beams and elongated members can vary by as much as a few inches although in the more preferred embodiments the variance is less than 1 inch.

Additionally, all dimensions recited herein are approximate and can vary by as much as +/−10% to in some case +/−25%. In some situations, the term "about" is used to indicate this tolerance. And when the term "about" is used before reciting a range, it is understood that the term is applicable to each recited value in the range. Often, the craftsmanship and engineering procedures that are followed in construction of these mats minimize these tolerances as much as possible or industrially practical.

Figure 2:
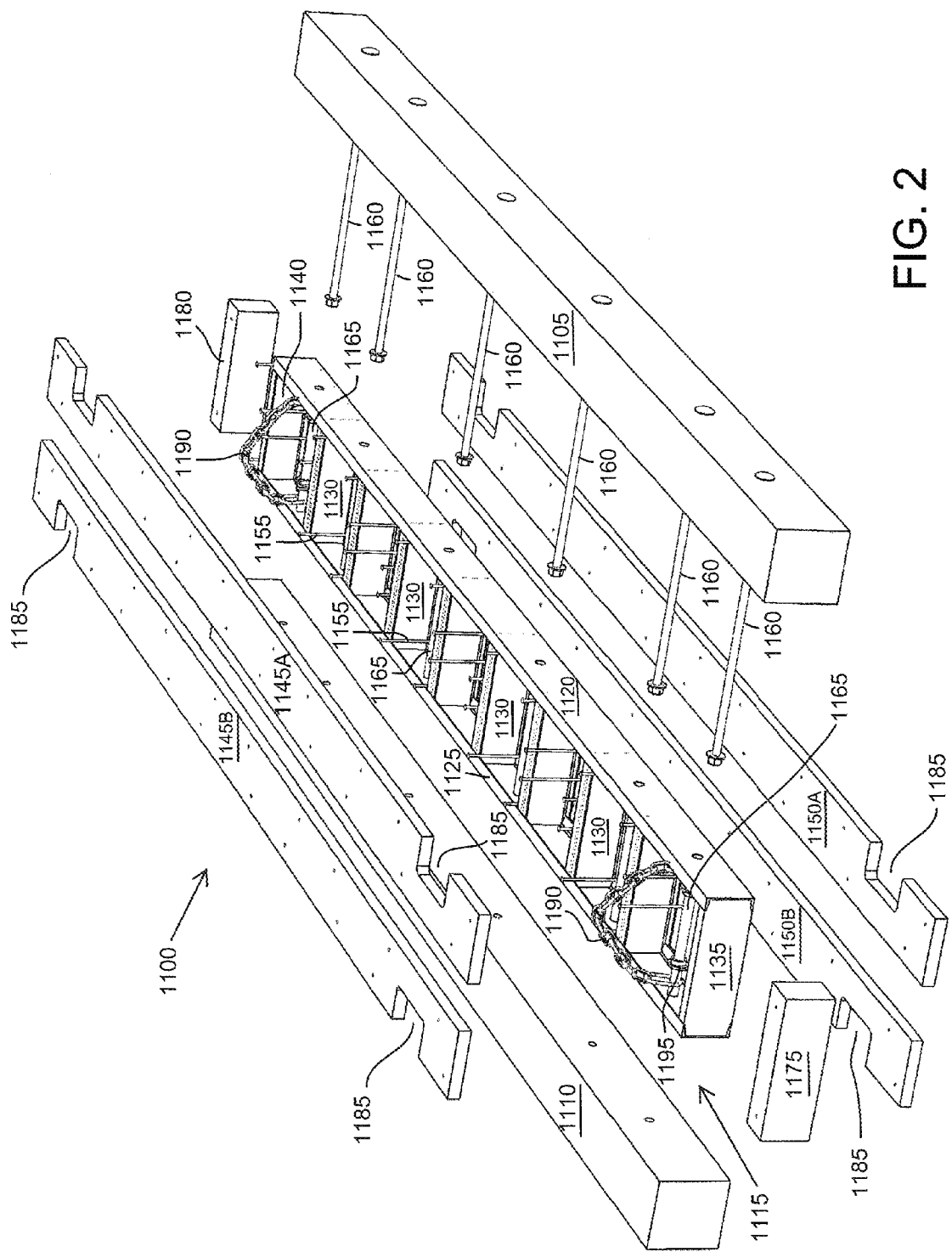
FIG. 2 is an exploded view of the mat of FIG. 1 to illustrate the various components present therein.

Turning now to the figures, FIGS. 1 and 2 illustrate a first embodiment of the invention in the form of a mat 1100 having substantially flat top and bottom surfaces. Although the bottom surface of the mat is not shown in these figures, the mat is preferably made with the same structure on both surfaces so that either one can be used as the upper surface of the mat that is to receive equipment or vehicles thereon. While this facilitates installation in that there is no requirement for placement of the mat in a particular orientation, it also allows the installer to select the surface of the mat that is in better condition to be used as the upper surface of the mat.

The mat 1100 includes first and second side beams (1105, 1110) having top, side and bottom surfaces, with the beams having width and height dimensions of between 6×6 inches and 24×24 inches and a length of at least 4 feet and typically between 10 and 60 feet. Preferably the lengths of the beams are in the range of 20 to 40 feet and preferably 30 to 40 feet as these length mats are easier to transport and ship compared to longer mats. Other dimensions that are typically used for the side beams are 8×8, 10×10, 12×12, 14×14 and 16×16 although a skilled artisan can select other dimensions as desired.

Typically, the widths and heights of the side beams are of the same dimension so that the beams have a square cross-section. Alternatively, for certain designs, the beams may be rectangular in cross section, with the width being about twice the dimension of the height or vice versa. Other typical dimensions are 6×12, 6×18, 8×10, 8×12, 12×14, 12×16, 12×24, and 18×24. These rectangular beams may be connected to the support structure with the longer side as the height or with the longer side as the width, depending upon the desired use of the mat. Using the longer side as the width is generally preferred for interlocking mat arrangements.

A support structure 1115 is located between and connecting the first and second side beams (1105, 1110), with the support structure having upper, lower and side portions, a height that is less than that of the side beams, a width and a length. The support structure, which is set forth in more detail in FIG. 3, includes first and second longitudinal members (1120, 1125) that are joined together by a plurality of cross members 1130.

The support structure 1115 may be made of steel components with the cross members 1130 welded to the longitudinal members 1120, 1125 to form a ladder type structure which forms a frame for the support structure. At the front and rear ends of the frame, additional cross members 1135, 1140 may be provided to form a peripheral rectangular structure. For this embodiment, it is preferred that both the longitudinal members and additional cross members 1135, 1140 be C-shaped beams having a relatively flat plate with upper and lower flanges directed away from one side of the plate. The surface of the flat plate opposite the flanges of the longitudinal members faces the side beams 1105, 1110 so that a close and secure connection can be made between the two. The flanges of the C-shaped beam also serve as a point of connection for elongated members (1145 A, 1145B: 1150A, 1150B). Bolts 1155 can be attached to the flanges or to the cross members for this purpose. The flanges of cross-members 1135, 1140 also face the interior of the support structure so that the ends of the ladder frame have relatively smooth faces.

Figure 3:
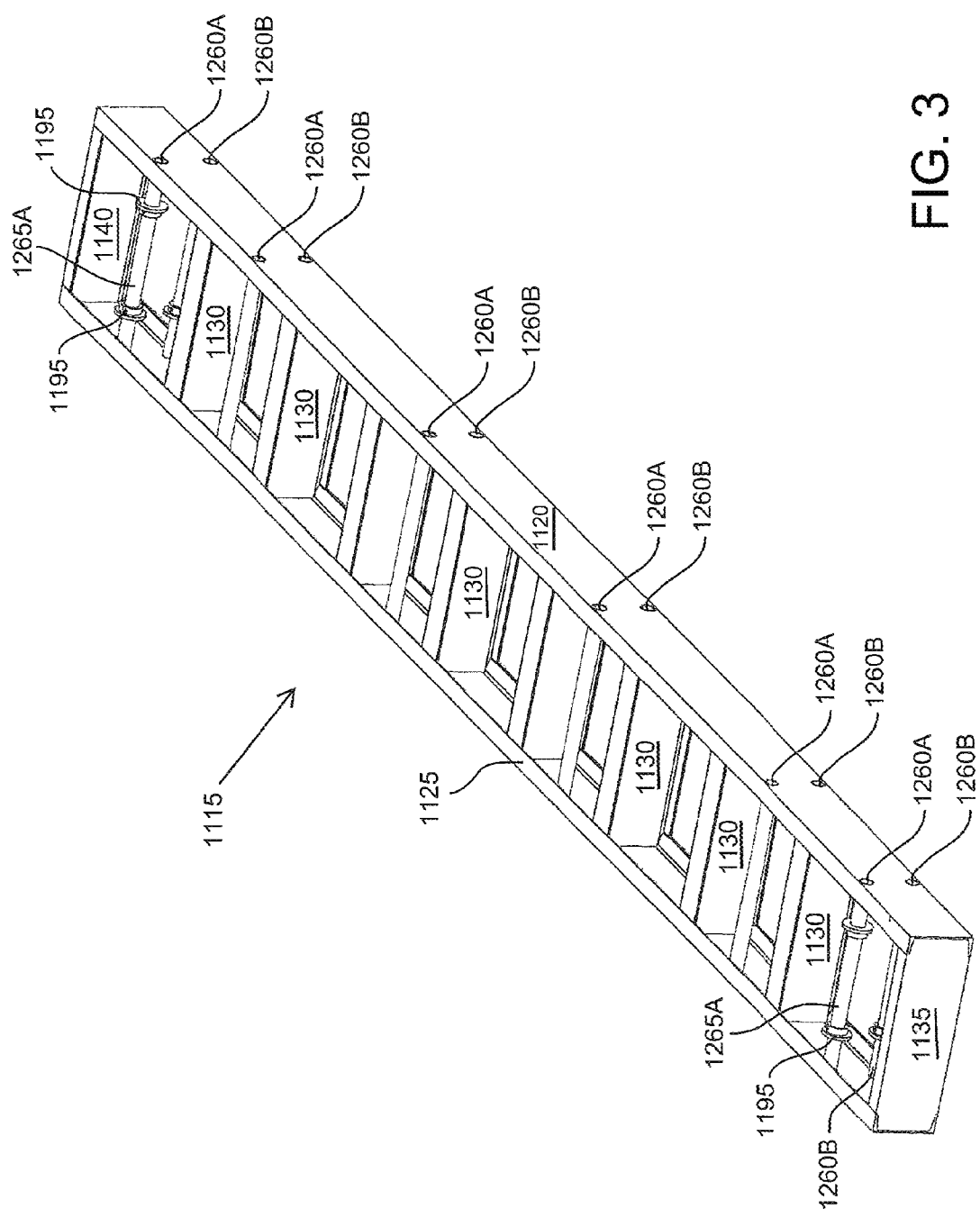
FIG. 3 is a perspective view of the support structure for the mat of FIG. 1.

The cross members 1130 can be attached to the C-shaped beam between the top and bottom flanges to form vertical connectors of the support structure that provide the desired strength and rigidity. As shown in FIGS. 2 and 3, the resulting structure is a rectangular box frame with spaced cross members on the front, back, top and bottom.

The cross members 1130 of the support structure greatly contribute to the stiffness and rigidity of the frame. These members are typically spaced 12 to 24 inches apart for support structures that are used for the smaller sizes of height and width beams. For larger size beams, the spacing can be reduced to 10 to 16 inches in order to provide sufficient strength to hold the mat together. The determination of the spacing of the cross members can be calculated for any particular size mat using generally known engineering guidelines and equations so a more detailed explanation is not needed herein. The cross members typically have a height that is at least half the height of the longitudinal members to which they are attached and preferably are about the same height as the longitudinal members. If desired, reinforcement members can be added to the structure. In one such arrangement, additional plates, rods, beams or other structural components can be added to the top and/or bottom portions of the support structure between the longitudinal members. This is certainly advantageous when supporting the largest or heaviest equipment on the mat. Also, other structural members can be provided between the cross members however in most situations this is not necessary. If additional reinforcement is needed, care must be taken for positioning such members to avoid blocking or interfering with the passage of the joining rods through the longitudinal members and into the support structure.

The C-shaped beam and cross members are typically made of a metal such as steel so that the structure can be made by welding the cross members to the beams. While the preferred construction of the metal frame of the support structure is by welding, the frame components can instead be joined together by brazing, rivets or bolting if desired depending upon the size and configuration of the overall support structure. Instead of a C-shaped beam, a flat plate (i.e., one without flanges) of the appropriate thickness can be used. For this arrangement, the cross members may have an I-beam shape to provide further strengthening of the support structure. A C-shaped steel beam is preferred for the longitudinal members, however, because the flanges provide additional rigidity and support to the structure as well as support for the cross members during installation. Of course, this can be compensated for by using a thicker flat plate for the longitudinal members when that embodiment is to be used. And the I-shaped beams can be used for the cross member when a C-shaped longitudinal member is used, with appropriate adjustments made where the flanges of each come into contact with each other.

When the components of the support structures are made of metal, steel is typically used as that material is readily available and of low-cost. Although not necessary for most applications, the support structure can instead be made of a more corrosion resistant material such as stainless steel, copper, bronze, or other alloys. When carbon steel is used, however, the corrosion resistance can be enhanced by painting or coating the structure so that it would be more resistant to moisture. Also, steel can be galvanized or provided with another type of protective coating so that it would have a lower tendency to rust when contacted by moisture.

Aluminum or titanium can also be used for the support structure in specialty applications. All of these materials generally have higher cost than steel and can present joining the problems of greater difficulties in welding or brazing the cross members to the longitudinal members. It is possible in an alternative embodiment as noted to use rivets or bolting to connect the various longitudinal and cross members together to form the frame of the support structure. The sizing of the rivets or bolts as well as the dimensions for the welding and brazing, can be readily determined by a skilled artisans using routine testing if necessary. The same is true for the thickness of the beams or members that are used in the frame structure.

Alternatively, the support structure may be made of a fiberglass reinforced thermosetting plastic material resin, which is typically a polyester or epoxy resin. The components of the structure may be pultruded in the form of a rectangular or square tube which may be hollow or filled with other materials depending on the overall weight and compressibility desired for the construction.

When fiberglass reinforced thermosetting plastic material is used to form the support structure, the box or ladder frame can be prepared in the desired shape with the cross members and longitudinal members joined together with resin prior to curing. It is also possible to utilize bolting or other mechanical fasteners to connect these components together.

A plurality of joining rods 1160 are used to attach the side beams to the support structure, with the joining rods passing through the sides of the beams and support structure. These joining rods 1160 are typically large carriage bolts that include threaded ends to receive nuts that when assembled will hold the components together. These rods are spaced about 3 to 6 feet apart depending upon the size of the mat. FIG. 2 shows the rods 1160 passing through side beam 1105 and toward the side structure: FIG. 3 shows how the rods 1160 would appear when present in the support structure. These carriage bolts are typically made of a high strength steel. Also, in some embodiments, the beams can include a sleeve that facilitates passage of the bolts through the support core. The sleeve can be a flanged hollow tube that extends through the support core and if desired into one side beam and part of the opposite side beam. The tube would terminate in the opposite beam so that it would not interfere with the net that engages the threaded end of the bolt. The sleeves are shown in FIG. 3 as elements 1165.

To form a substantially flat surface on the mat, various elongated members for upper and lower elongated members (1145A, 1145B, 1150A, 1150B) are provided. A first plurality of elongated members (1145A, 1145B) are attached to an upper portion of the support structure 1115 while a second plurality of elongated members is attached to a lower portion of the support structure 1115. Thus, the top surface of the mat is formed by the top surfaces of the side beams 1105, 1110 and the first plurality of elongated members 1145A, 1145B, while the bottom surface of the mat is formed by the bottom surfaces of the side beams 1105, 1110 and the second plurality of elongated members 1150A, 1150B. The flat top surface of the mat is best shown in FIG. 1.

As the upper and lower surfaces of the mat must be somewhat uniform, the support structure and upper and lower elongated members generally have a combined height that is the same as that of the side beams. Typically, the support structure is centered vertically with respect to the side beams. As an example, the side beams can be 12×12 and the support structure would have a height of 8 inches so that the beams extend 2 inches above the top of the support structure and 2 inches below the bottom of the support structure. This provides room on the top and bottom of the support structure to accommodate 2 inch thick elongated members so that the top and bottom of the mat has substantially uniform surfaces. This type construction is preferred in that it minimizes the different types of thickness that need to be used for the elongated members and also provides a symmetrical mat that be oriented with wither surface facing up to receive equipment thereon. In other embodiments, different thicknesses of elongated members can be used on the top than on the bottom with the intent being that the thinner members are used on the bottom to prevent dirt or other materials from entering the support structure, while the elongated members on the top surface are provide to support the equipment or vehicles that are located or move upon the mat. In this embodiment, it is possible to provide a flat plate on the support structure of the lower surface rather than elongated members.

The same is true for the ends of the support structures. The longitudinal members 1120, 1125 can be shorter than the length of the side beams 1105, 1110 by a distance of about 1 to 24 inches on each end or by a total of 2 to 48 inches. The distance of the shortened ends can correspond to the width of the side beams, if desired. The space between the shortened ends of the support structure 1115 and the side beams can be filled in with bumper members 1175, 1180 which then allow the mat to have substantially flat front had rear ends. These bumper members can be of the same width as the elongated members so that the same material for the elongated members can be used to provide bumper members for the front and rear of the support. This creates a symmetrical structure but different thicknesses of the bumper members can be used.

In a less preferred embodiment, the longitudinal members 1120, 1125 can be substantially the same length as that of the side beams 1105, 1110 so that the front and rear cross members 1135, 1140 form with the ends of the side beams the front and rear ends of the mat.

FIG. 1 also illustrates a lifting element 1190 in the form of a chain the ends of which are secured to a joining rod 1160. Each end of the chain 1190 passes through an opening 1185. The chain is configured of steel having sufficient strength to be able to lift the entire mat without bending or breaking. Also, the links at either end of the chain can be securely attached to the joining rod when the mat is assembled.

In a preferred arrangement, only one end of the chain 1190 is permanently secured to the joining rod, while the other is attached by a conventional connectable link. Thus, after the ma is moved into position, the chain can be disconnected and stored inside support structure so that personnel working on the mat will not trip over the chain.

Alternatively, if a removable chain is desired, such as may be supplied with the equipment used to move the mats, the chain can be provided with a connectable link on each end so that the workers can attach each end of the chain to the joining rod when the mat is to be moved. After the mat is installed, however, the chain can be removed from the joining rod and reused for moving or installing other mats. This again provides greater safety for workers as the chains are not present on the surface of the mat during use.

And for additional safety, the size of the opening 1185 is reduced compared to mats of the prior art. As the opening 1185 provided for connecting the chain is much smaller than the previous opening or cut away beam that exposed the joining rod, personnel who are working or conducting operations upon the mat have a much lower chance of stepping into hole 1185.

FIG. 2 illustrates that the joining rod 1160 includes a flange or ring 1195 which is welded to the joining rod beneath hole 1185. This flange or ring 1195 is used to retain the end or connecting link of the chain 1190 in the proper position beneath hole 1185. In this way, the chain is pulled upward in a way that does not interfere with elongated members 1145A, 1145B.

As noted in FIGS. 1-3, openings 1185 are provided on the near the front and rear portions of the upper surface of the mat, as well as on the lower front and rear portions. This allows the installer to grasp any side or end of the mat to facilitate installation. And when a removable chain is provided, it can simply be attached to the holes at the easiest accessible end of the mat for lifting.

The mat must also provide sufficient load bearing capacity: A fully supported mat (one that is properly installed on a suitable prepared ground surface) must be able to withstand a 10 ton load, spread over a 12 inch diameter surface without degradation of mat properties or permanent deformation of the mat. The support structure would have a crush resistance of between about 500 and psi to possibly as much as 1000 psi depending upon the application and when properly installed on a suitably prepared ground surface. This provides resistance against compression as large vehicles or equipment move over or are placed upon the mat.

The side beams of the mat prevent or reduce damage to the support structure from side entrance or egress onto the mat from large vehicles with steel tracks. These beams can be replaced when necessary while the support structure can be reused to make a new mat.

The elongated members as well as the side beams are preferably made of any type of wood although oak is typically preferred. These members may also be made of engineered wood or lumber since that will be easier to make long lengths without having to obtain one piece virgin wood lengths. Additionally a layered veneer laminate can also be used for these members or beams. It is expected that the cost for that material would be about the same as the price for oak thus making it an attractive alternative.

Engineered lumber (or engineered wood) includes a range of derivative wood products which are manufactured by binding or fixing the strands, particles, fibers, or veneers or boards of wood, together with adhesives, or other methods of fixation to form wood composite materials. These materials provide the surprising benefit of repeatable consistency of the required sizes, the ability to mix different wood species to arrive at the final product, and exceptional properties generally exceeding what is provided from monolithic boards.

There are three types of engineered wood that can be used in the present invention:
  parallel strand laminate (PSL), which is a beam that can be manufactured up to about 12×12 inches in any length due to the production of the beam by a continuous process;
  layered stand laminate (LSL), which is a billet that can be made at thicknesses of from about 1" to 4", in widths from about 2 inches to 54", and in lengths of about 8 feet to 64 feet; and layered veneer laminate (LVL) which is also a billet that can be made up to about 4 feet square by any length.

Alternatively, the side beams and elongated members may be made of a fiberglass reinforced thermosetting plastic material such as fiberglass reinforced polyester or epoxy resins. These materials may be pultruded into a solid form or preferably as a rectangular or square tube. If desired, hollow tubes can be filled with any one of a variety of materials to contribute to the overall strength or compression resistance of the tube. Typically, crumb rubber, recycled tires or other plastic or elastomeric materials, sand, crushed rock or polyurethane foam may be provided inside the tube either before or after attachment to the support structure. A polyurethane foam is preferred for this purpose as it can be injected in a liquid form after the pultrusion is attached to the support structure. For stronger or heavier filler, the joining rods may be initially placed into the beam so that the filler does not block the insertion of the rods when joining the side beams to the support structure. Additionally, a metal or pultruded plastic tubular sleeve can be provided in the beams at the locations where the rods are to be inserted, so that the rod has an opening that remains after the filler is placed into the beams.

As these mats are relatively massive, provision should be made for moving, transporting and installing the mat at the desired field location. For this purpose, holes are provided in the upper surface, lower surface, or both to provide access to one or more of the joining rods. These holes are formed as cut out portions 1185 of the elongated members 1145, 1150. In this way, the holes allow access by a hook from a crane or other mechanical attachment to the joining rods for lifting or manipulation of the mat. For convenience, the attachment openings 1185 are provided both on the upper and lower surfaces of the mat so that either surface can contact the ground or be exposed on top as the surface upon which the equipment is to be installed, thus facilitating installation.

Figure 4:
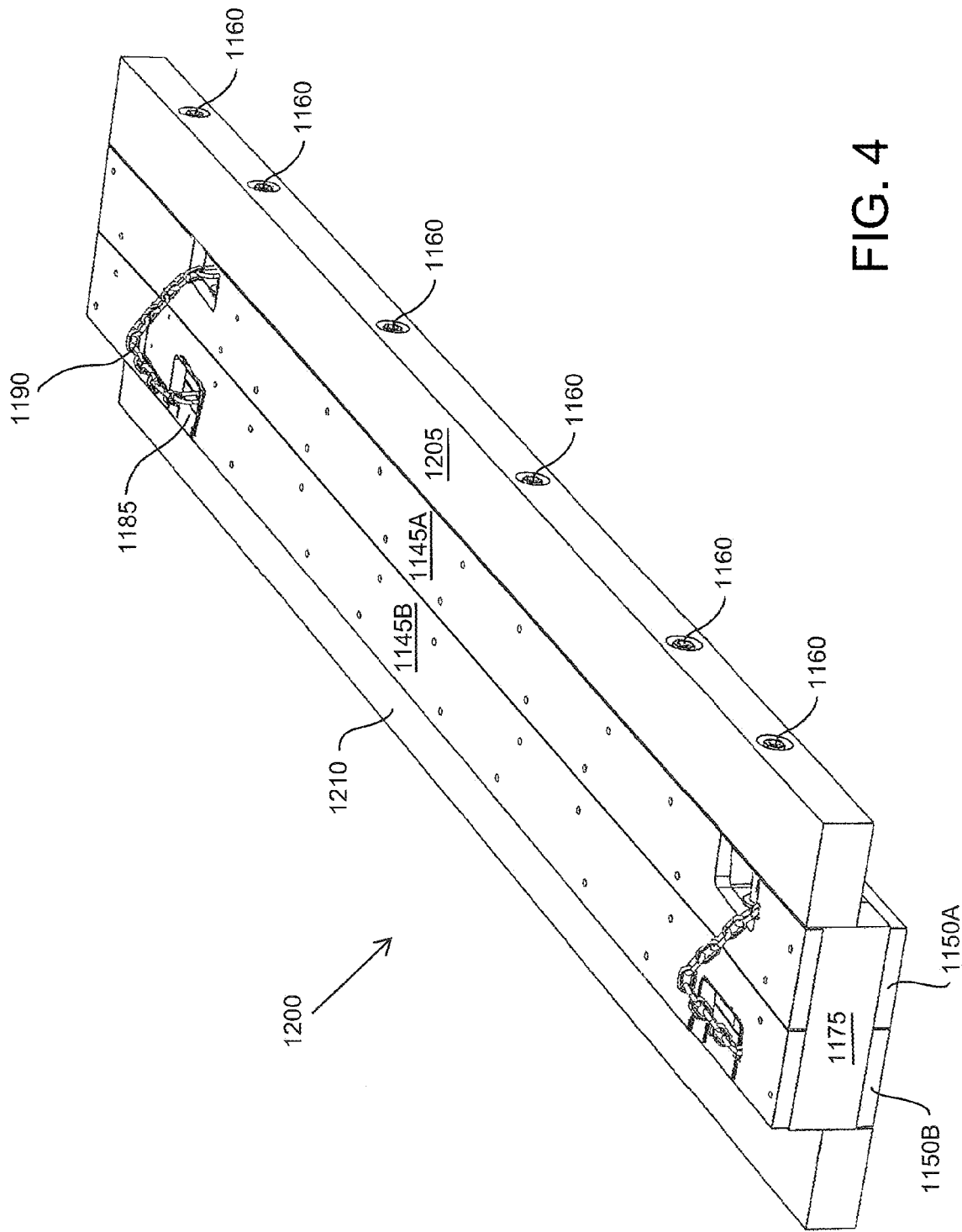
FIG. 4 is a perspective view of a second embodiment of a mat according to the present invention.
Figure 5:
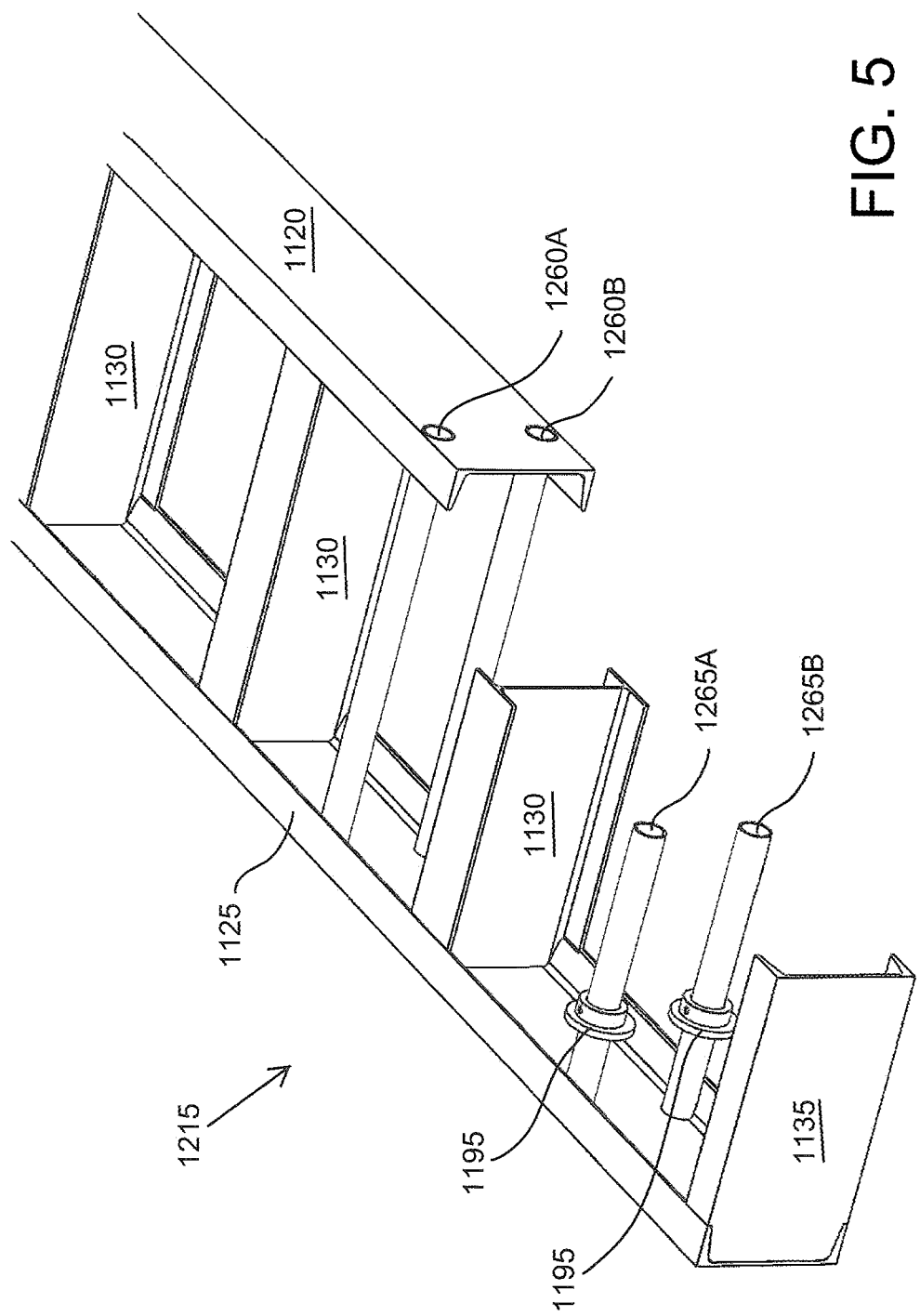
FIG. 5 is a partial sectional view of the support structure for the mat of FIG. 4.

Turning now to FIGS. 4 and 5, an alternative embodiment of the present invention is illustrated, in the form of a mat having side beams configured and dimensioned to allow interlocking of adjacent mats. Where like components are used from the previous embodiment, the same reference numerals will be used in FIGS. 4 and 5 and only the different features of this alternative embodiment will be described.

Mat 1200 includes side beams 1205, 1210 which are configured and dimensioned to represent only one half of the thickness of the mat. On one side of the mat, beam 1205 is attached to the upper portion of the support core 1215. This is done in a manner to extend the upper surface of beam 1205 above the top surface of the support structure 1215. As in the prior embodiment, elongated members 1145A, 1145B can be provided on the top portion of the support structure 1215 so that the top surface of the mat adjacent the side beam 1205 is relatively flat. In a similar manner, side beam 1210, which also has a thickness that is one half the thickness of the entire mat, is mounted to a lower end of the support structure 1215. The lower surface of side beam 1210 extends below the lower surface of the support structure to allow elongated members 1150A, 1150B to be accommodated to form a substantially flat surface for the bottom of the mat adjacent beam 1210.

This structure allows one mat to be initially placed on the ground with an adjacent mat placed such that beam 1205 sits upon beam 1210. This arrangement can be continued for as many mats as necessary to achieve a desired working base for cranes or other equipment.

The top surface of mat 1200 has a step on the opposite side from beam 1205, above beam 1210, while there remains an open space or step below beam 1205 adjacent the lower surface of the matt opposite beam 1210. While these surfaces allow interlocking of adjacent mats, it does not provide a stable mat surface on the outermost sides of the working base. To compensate for this, modified mats can be provided wherein the outermost end mats on one side of the working base can be made with beam 1105, which is the full thickness of the mat, on one aside and with beam 1210 on the opposite side to allow interlocking with adjacent mats that are configured like mat 1200. Similarly, the outermost end mats on the opposite side of the working base can be made with beams 1110 instead of 1210 on one side beam 1205 on the opposite side.

Alternatively, when the full extent of the entire working base is not known, of if an insufficient number of modified mats are not available, the mats on the outermost sides of the final working base can be provided with stabilizing beams of the same size and dimensions as beam 1205 provided in the space below attached beam 1205 so that the side of the mat can be stabilized. The same thing can be done for the outermost mats that have a step above beam 1210. A separate stabilizing member can be provided of the same size as beam 1210 to finish the upper surface of the mat at those locations. The stabilizing members can be attached to the beams of the mat if desired.

Mat 1200 requires a different system for connecting the beams 1205, 1210 to the support structure 1215. The connection of beam 1205 to the support structure 1215 will require that the joining rods 1260A pass through an upper portion of the support structure, whereas beam 1210 is connected to the support structure with joining rods 1260B passing through the beam and a lower portion of the support structure 1215. This is best shown in FIG. 5 where the relative positions of the joining rods 1260A, 1260B are illustrated, along with sleeves 1265A, 1265B.

FIGS. 4 and 5 illustrate a lifting element in the form of a lifting chain 1190 for a stepped mat 1200 which is used to provide an interlocking configuration with adjacent mats. The connection of chain 1190 to the joining rod is the same as shown in FIGS. 1-3, with the exception that the joining member 1160A on the top portion of the mat would be used when the chain or hook is accessing the mat from the top surface, while joining member 1160B would be used when the chain or hook is accessing the mat from the for the bottom surface. As in the other figures, the joining rod would include a flange or ring element 1195 to assist in positioning the terminal chain links in the proper location on the joining rod for lifting of the mats.

Figure 6:
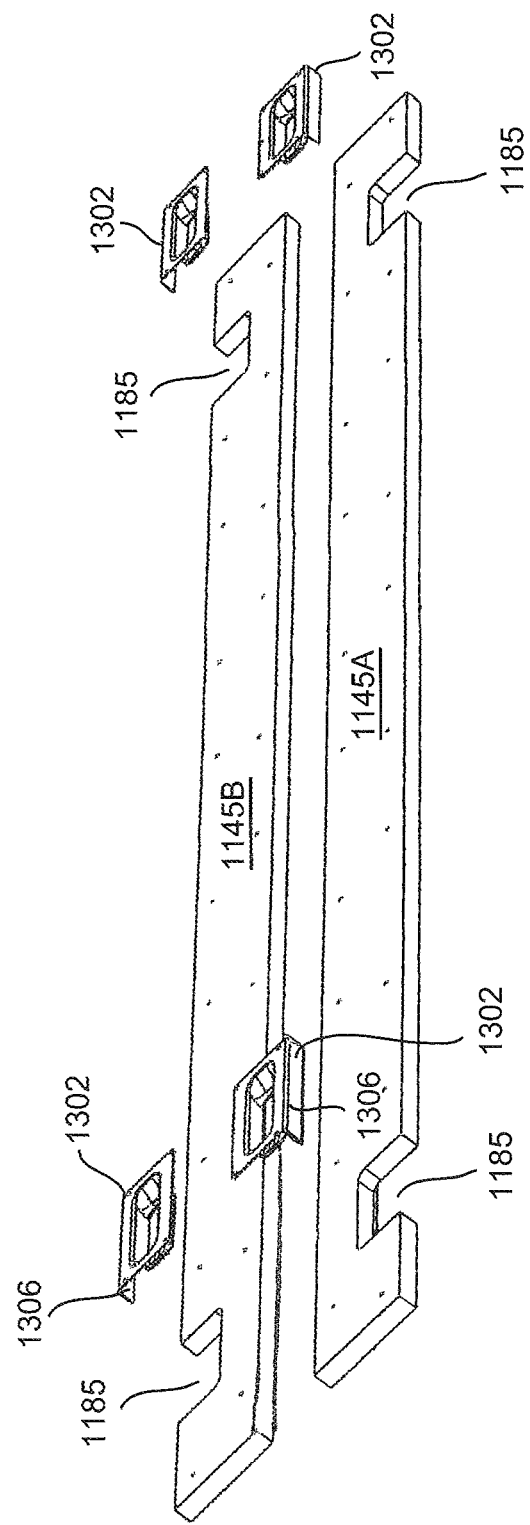
FIG. 6 is an exploded view of the collar members for the openings in the elongated members.
Figure 7:
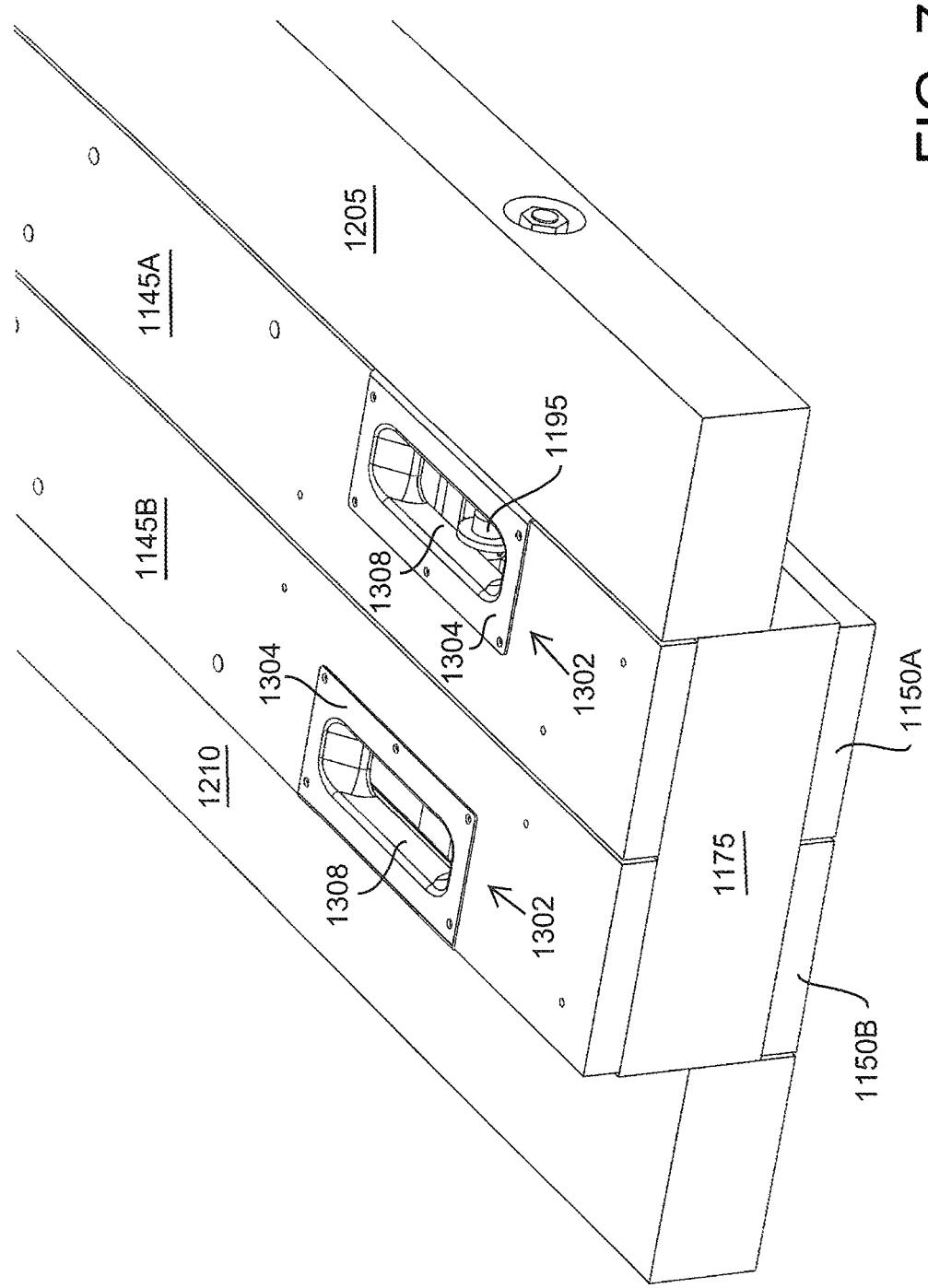
FIG. 7 is a perspective view of the collar members in place on a mat.

FIGS. 6 and 7 illustrate a metal collar 1302 that can be used to protect opening 1185. As shown, the collar 1302 has a flat upper plate 1304 that protects the surface of elongated members 1145A and 1145B adjacent opening 1185. Collar 1302 also includes a side plate 1306 which closes the side of opening 1185 and also protects the inner cut edges of opening 1185 in elongated members 1145A and 1145B. In particular, the inner cut edges of opening 1185 are protected by an inwardly extending wall 1308 which is bent from the top plate 1304 of collar 1302. This wall 1308 protects against contact and abrasion from the chain when lifting the mat. The collar member may also be designed to be in contact with the lifting member (1332 or 1328) to add stability to the assembly when the mat is being hoisted or moved. In addition to being used with a chain that can be attached to the mat through the two openings, the collar also facilitates attachment of a hook or other elongated member from a crane or other heavy equipment vehicle to engage joining rod 1160 for lifting or installation of the mat.

Figure 8:
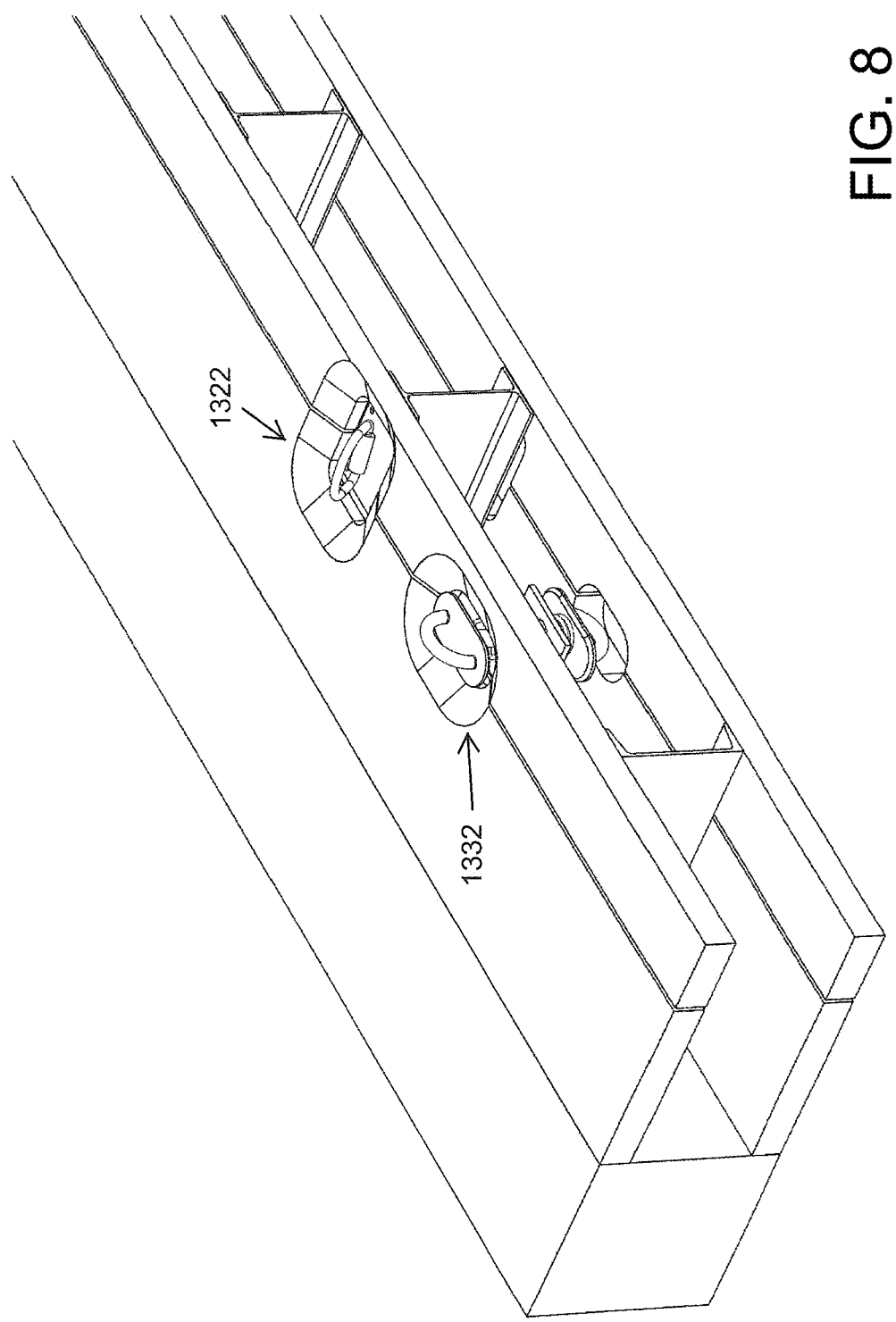
FIG. 8 is a perspective view of two alternative lifting members.
Figure 9:
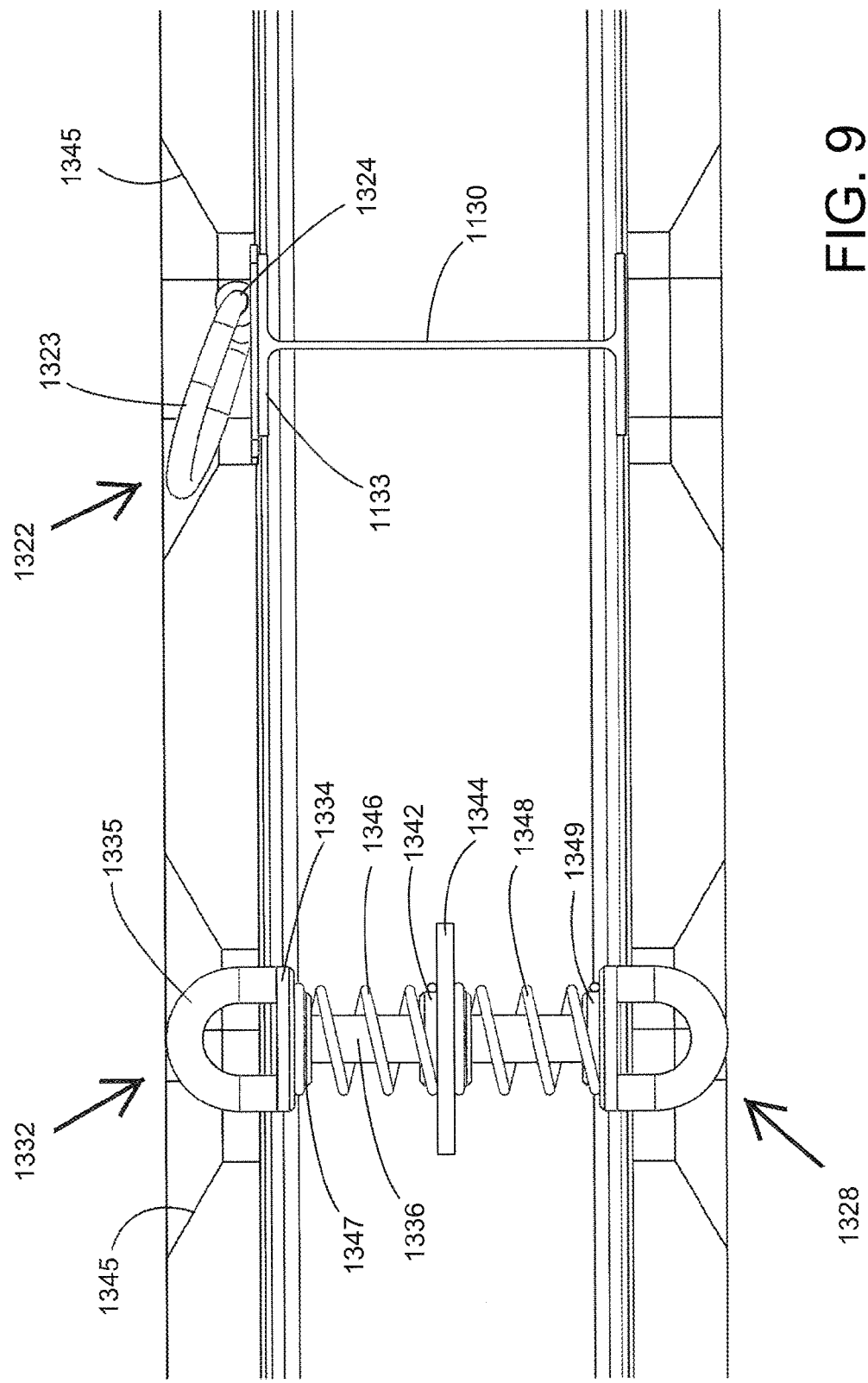
FIG. 9 is a side cross-sectional view of the lifting elements of FIG. 8 in their normal, non-use position.
Figure 10:
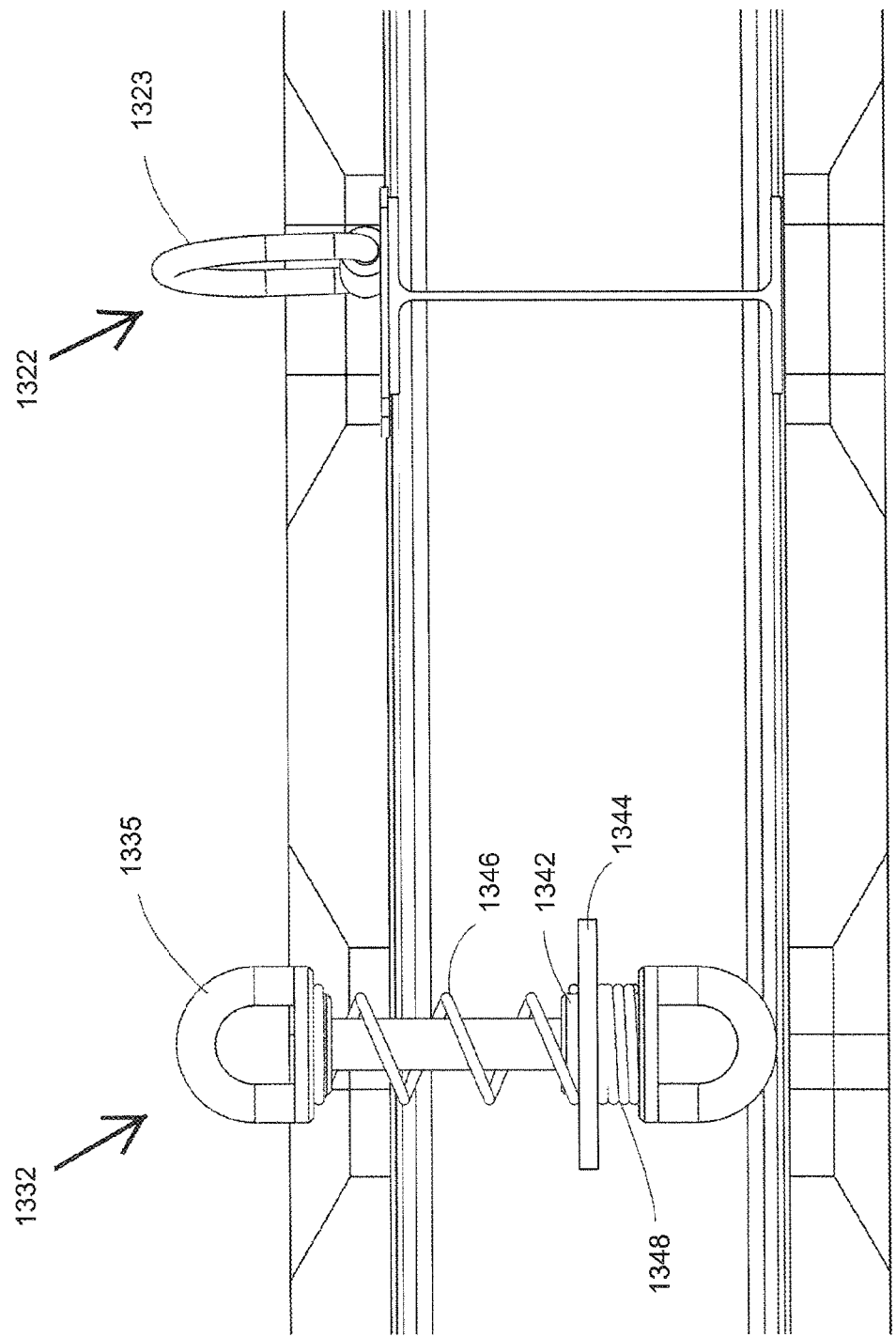
FIG. 10 is a side cross-sectional view of the lifting elements of FIG. 8 in their operative position during lifting of the mat.

FIGS. 8 to 10 illustrate additional lifting elements for the mats of the invention. These are shown schematically in FIG. 8 side by side although in practice these elements would most likely be used separately or at least in different areas on the mat.

One preferred element is a D Clip 1322, having a D-shaped ring 1323 the ends of which engage a metal tube 1324 that is welded to the top plate 1133 of one of the crossing members 1130. This structure allows the clip 1322 to be rotated to the position where it is perpendicular to the crossing member top plate 1133 so that it can be engaged by a hook of a crane or other heavy equipment vehicle. After the mat has been placed for service, and the hook removed, the clip 1322 can rotate so that it lays flat against the angled side wall 1345 of the opening in the elongated member, as shown in FIG. 9. This opening does not have to be deep and simply allows the clip 1322 to be pivoted through an angle of between 90 and 180° to facilitate access to and movement of the clip as the mat is being lifted. As in the other designs, the D clip can be provided in multiple locations on the mat, such as near the forward and/or rear ends or both on either or both of the upper and lower surfaces of the mat so that the mat can be lifted no matter how it is located on a transporting truck or train or after being installed. If desired, depending upon the width of the mat, a plurality of these lifting elements can be provided. They generally are provided about 10 to 24 inches away from the front or back end of the mat and preferably on the top and bottom surfaces. Typically, one or two clips near each end of the mat are all that would be necessary for manipulation of the sizes of the mats of the present invention, but a skilled artisan can determine whether more or less lifting elements are needed for any particular mat size and design.

FIGS. 8 to 10 also illustrate an alternative embodiment of a U-shaped member 1332 that is attached to the support structure in a way that the U-shaped ring 1335 does not protrude above the elongated members on either the top or bottom surfaces of the mat. The hook 1332 is welded to a plate 1334 that is mounted on a rod 1336 that passes through the support structure. While only one U-shaped member is often suitable for lifting the mat from one side, it is advantageous to provide the opposite end of the rod with a second U-shaped member 1328 of the same configuration protruding from the lower surface of the mat as this allows the mat to be lifted from either the top or bottom surface. In a normal or non-operative state, as shown in FIG. 9, each U-shaped member sits in an opening in the elongated member that has angled sides 1345 with its upper member approximately uniform with the top surface or bottom surface of the elongated members of the mat. The angled holes 1345 are essentially the same regardless of whether clip 1322 or U-shaped member 1332 are used and allow greater access to the lifting member.

Rod 1336 is mounted for reciprocal motion through a bushing 1342 that is located in a plate 1344 that is welded to a central portion of the support structure, typically to one of the cross members. Rod 1336 is also capable of rotating in bushing 1342 as well as in the bushings that re provided in the upper and lower portions of the support structure so that U-shaped portions 1322, 1328 can rotate 360 degrees to facilitate attachment of a crane hook or manipulation of the mat during lifting or movement. Plate 1344 is preferably attached to cross members or side beams of the support structure. Additional bushings 1347, 1349 are provided in the upper and lower plates of the cross members or side members of the support core. The U-shaped portions 1322, 1328 are each maintained in a static position by springs 1346, 1348. When the mat is to be lifted, the ring 1335 is engaged with another hook from a crane or heavy equipment vehicle and as it lifts the mat, spring 1348 is compressed with ring 1335 being pulled partially out of the angled hole. This arrangement allows the hook on either U-shaped member on either side of the mat to be accessed and pulled for lifting the mat. After the lifting operation or placement operation is complete, and the hook is removed, the U-shaped member would return back to its normal unhooked position.

As above with the D-shaped lifting element, each U-shaped member is provided in an opening 1345 which is beveled or otherwise angled or widened to allow access to the U-shaped member by the crane hook.

For certain mats, the U-shaped member can be simply welded to a plate on the top of the of one of the cross members, but in this embodiment the U-shaped member must extend sufficiently above the top surface or bottom surface of the mat to allow access by a crane hook. For this reason the spring mounted lifting elements are preferred.

Figure 11:
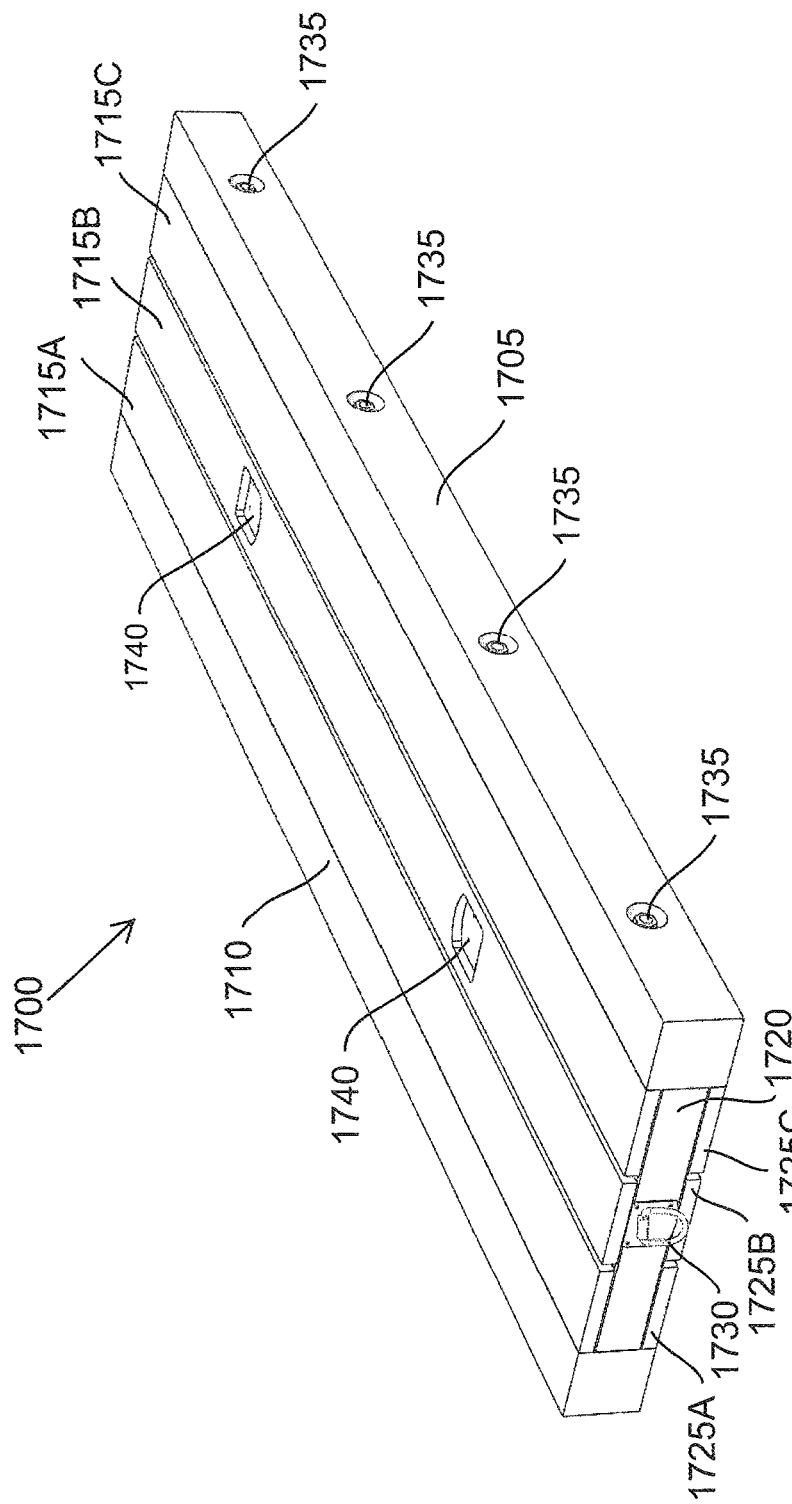
FIG. 11 is a perspective view of a crane or pipeline mat according to the present invention.
Figure 12:
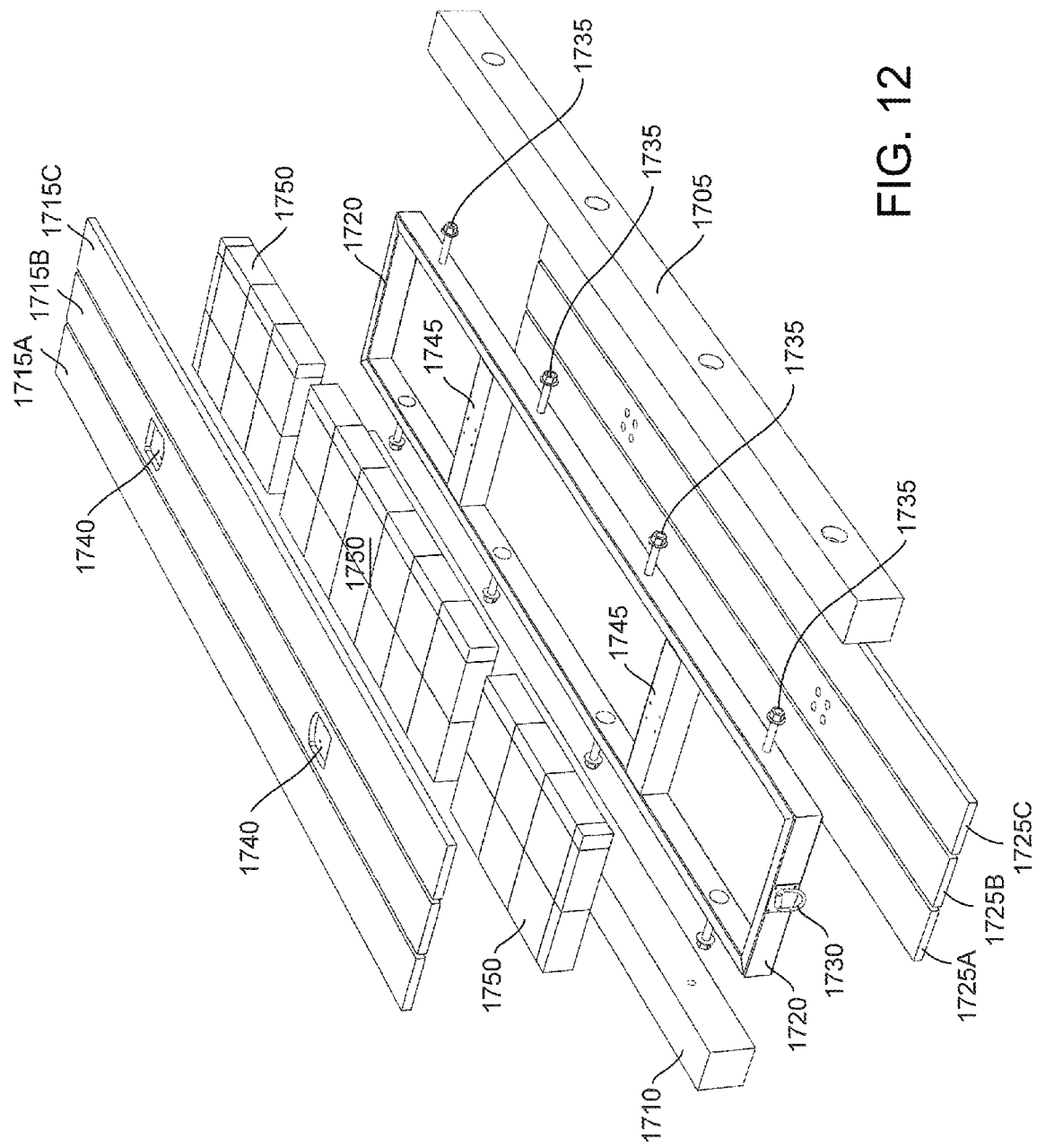
FIG. 12 is an exploded view of the crane or pipeline mat of FIG. 11.

FIGS. 11 and 12 illustrate another embodiment in the form of a crane/pipeline mat 1700 that has a typical thickness of about 8 to 12 inches, a typical width of about 4 feet and a typical length of between 12 and 20 feet. The mat 1700 includes two side beams 1705, 1710, a steel box frame 1720, an upper layer of elongated members 1715A, 1715B, 1715C, and a lower layer of elongated members 1725A, 1725B, 1725C. The core structure can be between 2 and 3 feet wide depending upon the width of the side beams. The upper or lower layers can also be a single sheet or plate of wood or metal of various thicknesses depending upon the size of the mat and the supporting properties that are needed for the intended. As noted herein, multiple plates or sheets can also be used if desired.

The steel frame 1720 includes a forward lifting element 1735 and two upper side lifting elements 1740. If desired, a rear lifting element and two lower side lifting elements (not shown) can also be provided. These lifting elements allowed the mat to be lifted overhead by a crane having a suitable lifting capacity to facilitate loading, unloading, and installing of the mats.

The lifting elements can be constructed as desired. If cables or chains are to be used, any holes made in the mat for such cables or chains must be drilled through the entire mat, and not just looped in between board or component spacings. The chains or cables must have at least three drop forged clamps. Cable must be new ¾ inch steel core, extra improved plow (EIPS), right regular lay wire rope, having a minimum breaking strength of over 29 tons. Chains should be ⅜" high test chain, having a working load limit of 5400 lbs. and a minimum breaking strength of 16,200 lbs. with ⅜ inch double clevis links, in order to provide a safe working load limit of about 5400 lbs.

Other lifting elements may be used as described herein. The lifting elements can be used with any of the mats disclosed herein provided that the appropriate core structure is present.

The components of mat 1700 are more clearly shown in the exploded drawing of FIG. 12. The steel frame 1720 is shown as having a plurality of components including two elongated side components, a front end component, a back end component and two cross members 1745, all of which are welded or bolted together to form the frame 1720. Side beam bolting members 1735 are also welded to the box frame 1720. These bolting members are configured to pass through openings in the side beams 1705, 1710 to secure the side beams to the steel box frame 1720. This is done by tightening nuts onto the ends of the bolting members 1735 after they pass through the holes in the side beams. The side beam holes are recessed so that the bolting and nuts do not extend beyond the sides of the beams.

The lifting elements 1730, 1740 are preferably in the shape of a D ring which is welded or bolted to the box frame 1720 or its cross members 1745 as best shown in FIG. 12. The upper layer elongated members 1715A, 1715B, 1715C, and lower layer elongated members 1725A, 1725B, 1725C are also bolted to the box frame 1720.

As the box frame 1720 defines open areas therein, it is best to fill those open areas with material that will contribute to the ruggedness and weight of the mat. In particular, a filler of wood members 1750 that either are scrap pieces from the production of other mats or are end grain or engineered wood can be used. It is also possible to use a less expensive wood material such as treated pine because the purpose of these filler materials is simply to add weight to the mat and they are not exposed to wear or abuse. And instead of wood material, the open areas of the core may be filled with other materials of the types disclosed elsewhere herein.

Figure 13:
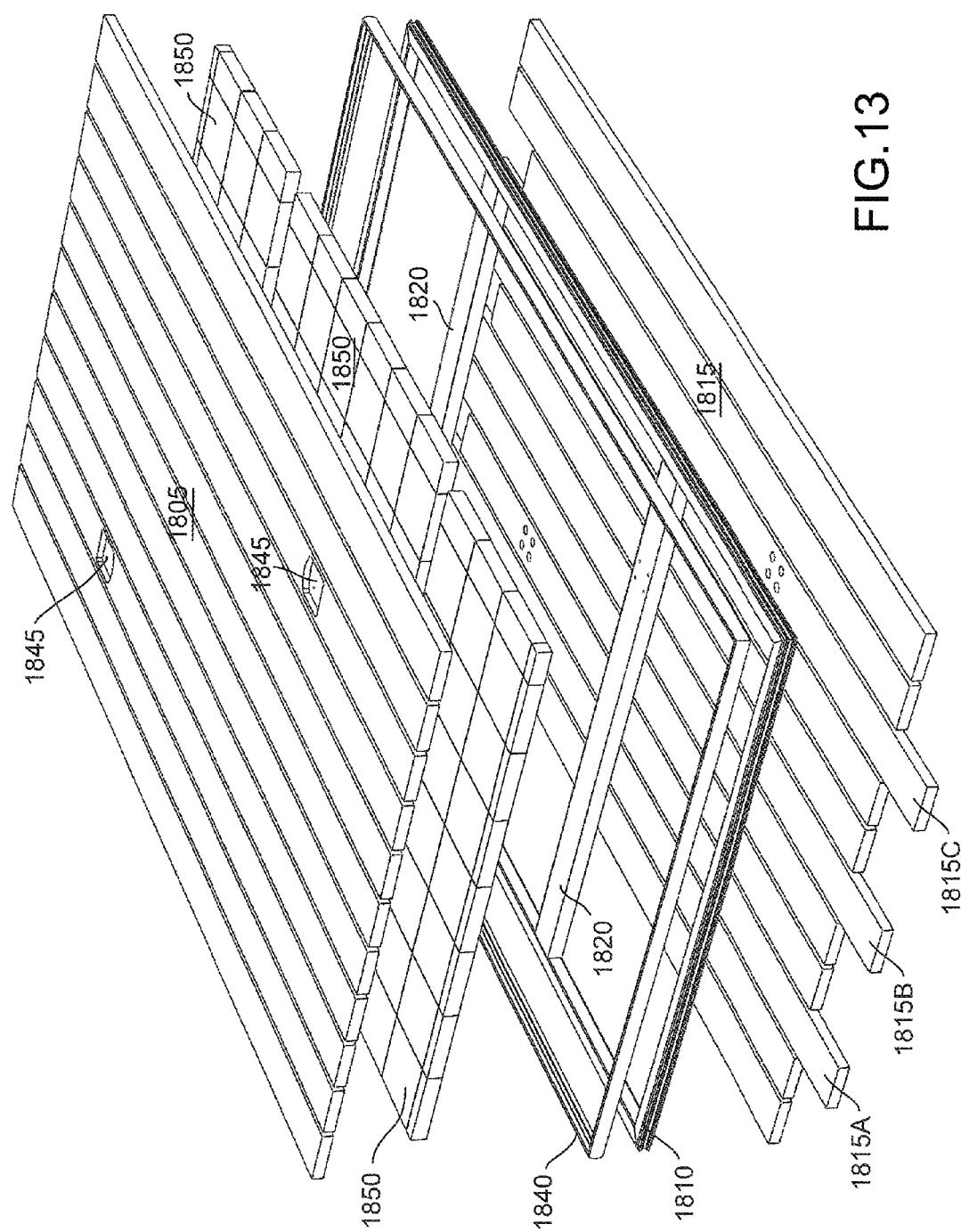
FIG. 13 is an exploded view of an interlocking mat having a steel frame and woodblock core.
Figure 14:
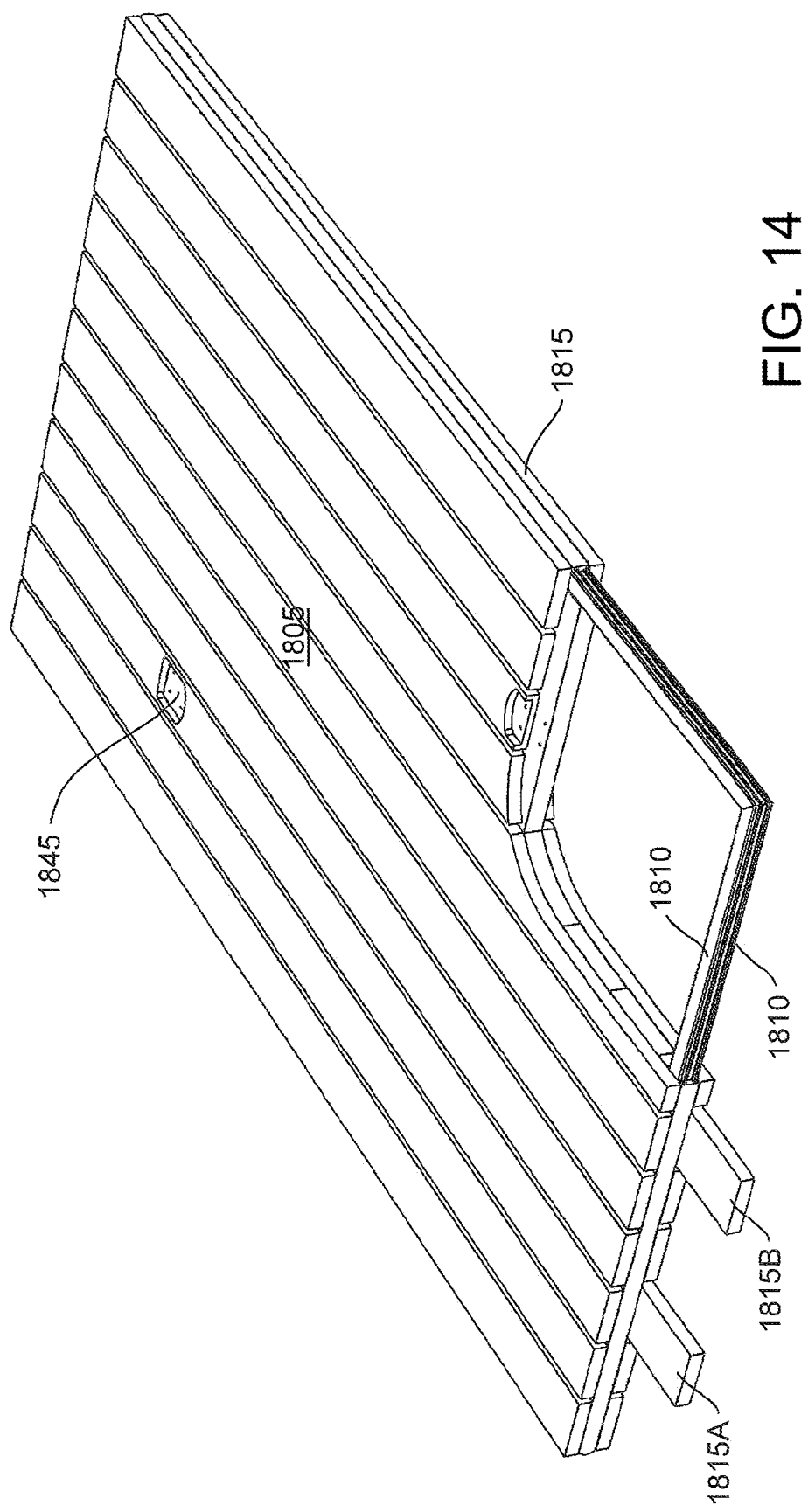
FIG. 14 is a view of the constructed mat of FIG. 13 with a portion of the corner removed to show the welded frame and core structure.

FIGS. 13 and 14 illustrate yet another mat 1800 that includes a steel frame core 1810. The core is used on an interlocking mat that has upper 1805 and lower 1815 layers of elongated members. These elongated members may be made of wood, engineered wood, or of a thermoplastic, elastomeric, rubber, or thermosetting plastic material. The plastic materials can be recycled plastics. The plastic and elastomeric or rubber materials can be used alone or can be reinforced as known in the art to provide additional strength, abrasion or wear resistance or to otherwise improve physical properties. And as noted herein, the upper and lower layers can instead be made of a metal sheet or plate. Preferably, wood is preferred as it provides abrasion and abuse protection to the mat at a relatively low cost. And as shown, three elongated members 1815A, 1815B, 1815C of the lower layer are offset from the others to form a configuration for interlocking with an adjacent similarly configured mat as disclosed elsewhere herein.

The steel frame 1810 includes four side members and two cross members 1820 which can be welded or bolted together to form the frame. The open space in the box frame can be filled with material that will contribute to the ruggedness and weight of the mat. In particular, a filler of wood members 1850 that either are scrap pieces from the production of other mats or are end grain or engineered wood can be used. It is also possible to use a less expensive wood material such as treated pine because the purpose of these filler materials is simply to add weight to the mat and they are not exposed to wear or abuse. And instead of wood material, the open areas of the core may be filled with other materials of the types disclosed elsewhere herein.

If desired, the mat can be made just of the frame and the upper and lower layers. To protect a steel frame from damage, however, a rectangular bumper configuration 1840 may be provided along all outer side surfaces of the steel box frame.

And as in the other embodiments, D-shaped lifting elements can be 1845 can be provided in various locations on the top and bottom of the mat in positions where they can be welded to the cross members 1820 of the steel frame. These would allow lifting of the mat and transport as well as placement into the appropriate locations during installation.

FIGS. 15 to 18 illustrate a crane mat 2300 comprising a plurality of a plurality of longitudinal beams 2305, 2310, 2315, 2320 that are positioned in a side by side arrangement. If desired, the mat can include metal plates located between one or more pairs (or between all pairs) of beams with the metal plates being essentially the same height and length as the beams. Each of the beams has a plurality of spaced lateral apertures passing therethrough, with the lateral apertures being in alignment to form bores through the mat, with each bore receiving a lateral rod. One such aperture 2325 is shown with the lateral rod 2330 passing therethrough and locked in place by a nut 2335 to hold the beams together in the side by side arrangement.

The mat is provided with at least two lifting elements each located in an opening in one of the beams, typically at each end of the mat. Alternatively, for wider mats, two spaced lifting elements can be provided at each end of the mat. Each lifting element 2340 is in the configuration of an eyelet. The lifting element 2340 has a body 2345 with a first end thereof 2350 connected to the lateral rod 2330 and a second end 2355 having grasping means 2360 for allowing a hook or connecting element of lifting equipment to engage the grasping means for lifting and manipulation of the mat. The grasping means 2360 is shown as an aperture in the second end 2355. The grasping means can also be a hook element or J- or L-shaped bar that can engage a mating connecting element on the lifting equipment.

The body 2345 is typically a flat plate that preferably has rounded corners but it also can be a bent or angled member that near one end has the necessary aperture to receive the lateral rod therein for attachment to the mat, and on the opposite end includes the aperture or other grasping means. In some cases, a chain or cable can be used instead of the flat plate with the chain or cable passing around the rod and out of the aperture to be engaged by the lifting equipment. The flat plate is preferred because it is more compact and thus requires a smaller hole than a chain or cable.

Figures 15, 16, 17:
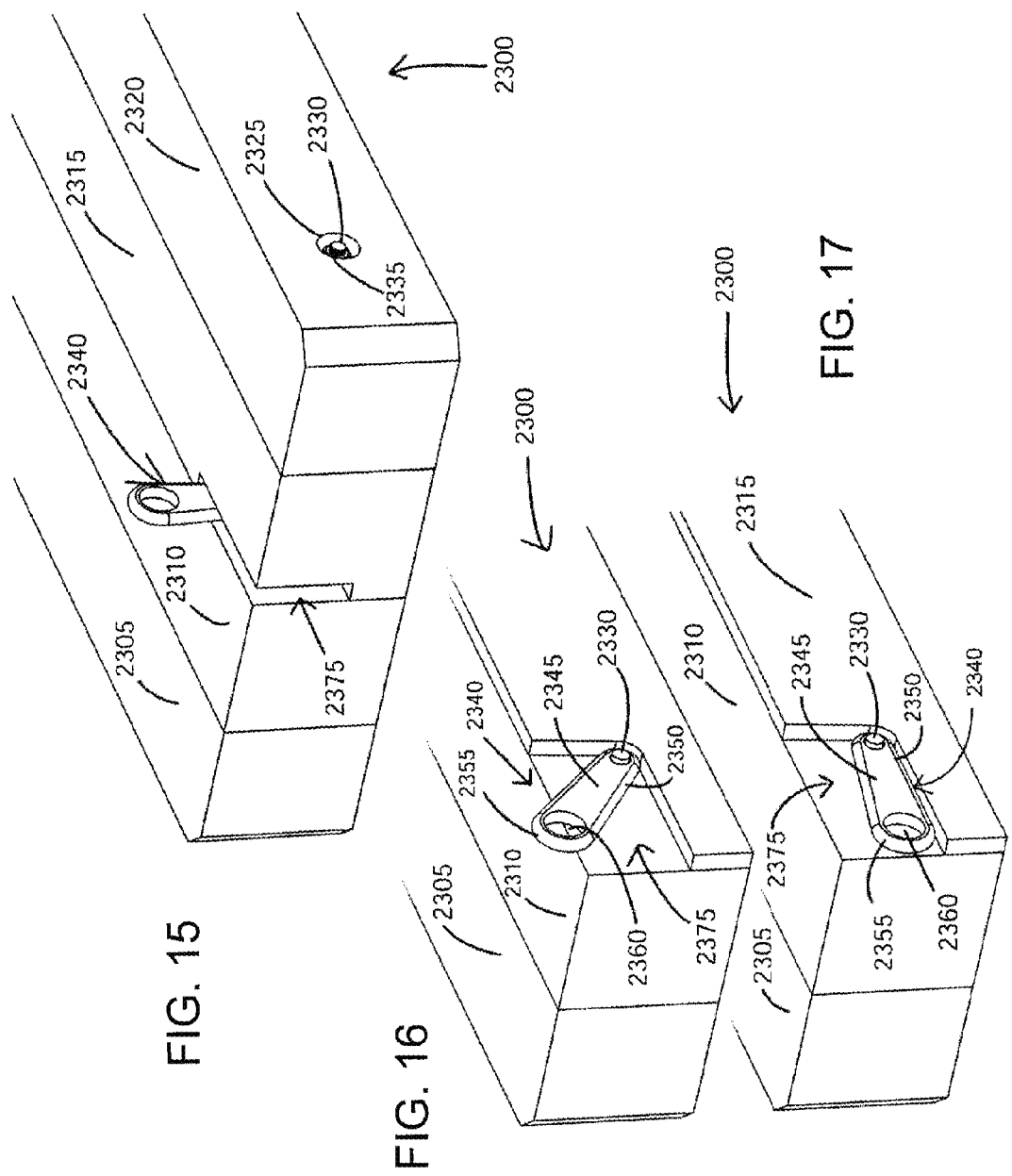
FIG. 15 is an end view of a crane mat to illustrate another lifting element for use with the mat.
FIG. 16 is a cutaway view of the lifting element of FIG. 15 as it is being raised from the opening in which it resides.
FIG. 17 is a cutaway view of the lifting element of FIG. 15 as it is retracted in the opening.

The opening 2375 is configured and dimensioned to hold and maintain the lifting element 2340 in the opening 2340 in a first retracted position as shown in FIG. 17 when not in use and to allow retrieval and removal of the second end 2355 of the lifting element from the opening 2375 to a second operative position that exposes the grasping means 2360 when the mat is to be lifted or manipulated, as shown in FIG. 15. FIG. 16 illustrates the second end 2355 of the lifting element in a position of movement between the first and second positions. The opening 2375 is either positioned at an end of the mat so that it is open at that end as shown or has a sufficient volume to allow a user to reach therein to grab and move the second end 2355 from the retracted position to the operative position.

Generally, one lifting element is located on a lateral rod nearest one end of the mat and another lifting element is located on a lateral rod nearest the opposite end of the mat. It is also possible to utilize four lifting elements, two on the lateral rod nearest the first end of the mat and two other lifting elements located on a lateral rod nearest the opposite end of the mat.

Figures 18, 18A, 18B:
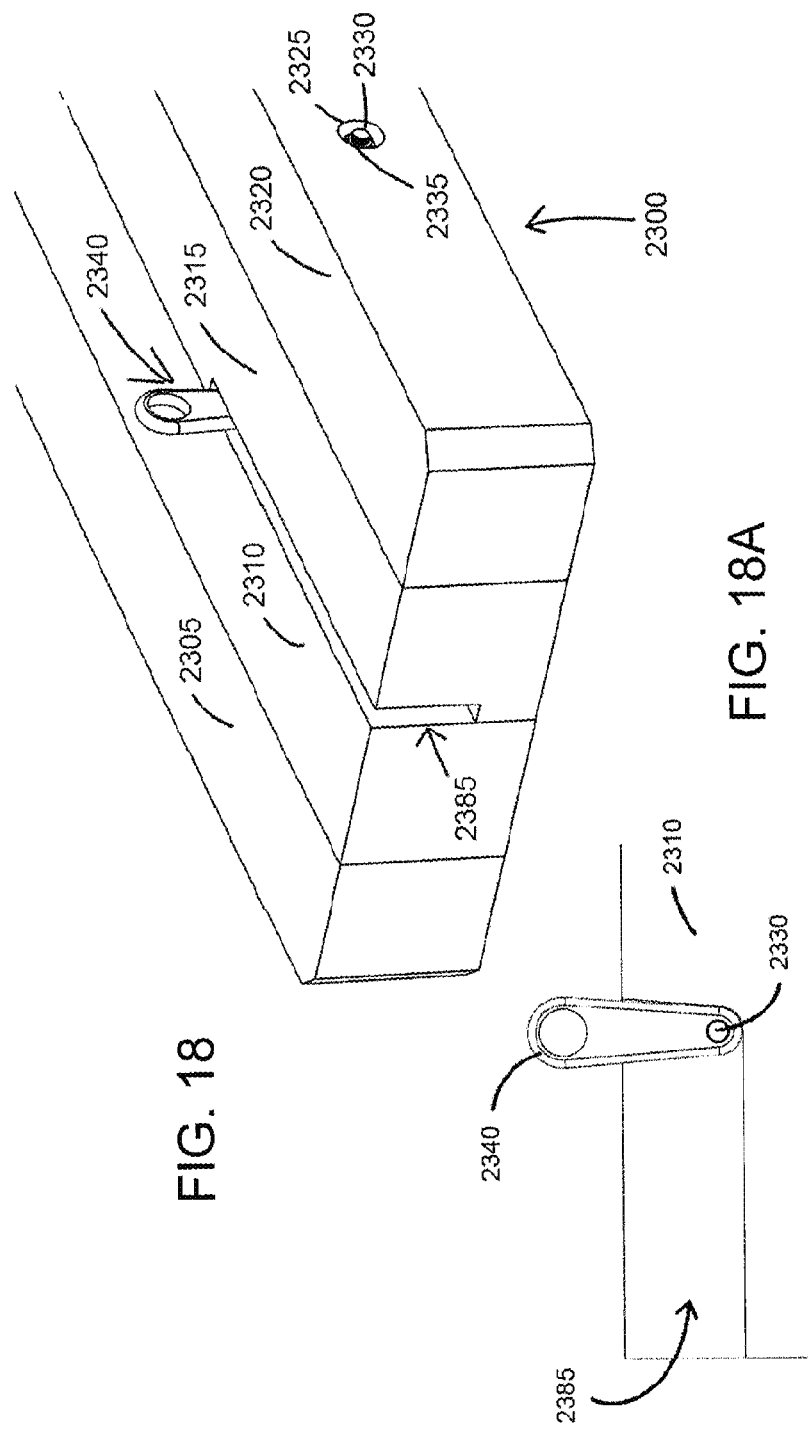

FIG. 18 illustrates a variation of the location of the lifting element shown in FIGS. 15-17. Elements which are the same as those in FIGS. 15-17 are designated with the same reference numbers in FIGS. 18, 18A, and 18B. In these figures, the lifting element 2340 is spaced from the end of the mat by a few feet, e.g., 1 to 3 feet. To provide access to the lifting element 2340, the opening 2385 in which the element resides is elongated so that it extends from the point where the lifting element 2340 is present all the way to the end of the mat. This provides access to the lifting element to remove it from its retracted position, which is shown in FIG.

18B, to an operative position as shown in FIG. 18A. Again, the lifting element 2340 has one end attached to joining bar 2330 which joins the beams together and which allows the lifting element 2340 to pivot between those positions.

And although the opening 2385 is illustrated as being much longer than the length of the lifting element, it is also possible to simply widen the opening about the retracted lifting element rather than have a thinner opening that extends to the end of the mat. The configuration of the openings 2375, 2385 should simply be sufficient to allow an operator to be able to reach in and grab the lifting element to raise it to its operative position. When the opening is placed further back in the mat, it should be widened to allow the hand of the operator to reach into the opening. And while the lifting element operates in the same way as in FIGS. 15-17, the opening is made slightly larger so that a worker may reach into the opening to pull up the free and of the lifting element 2340 to engage a hook or other part of a lifting device.

A number of additional features may be provided in the mats of the present invention.

Figure 19:
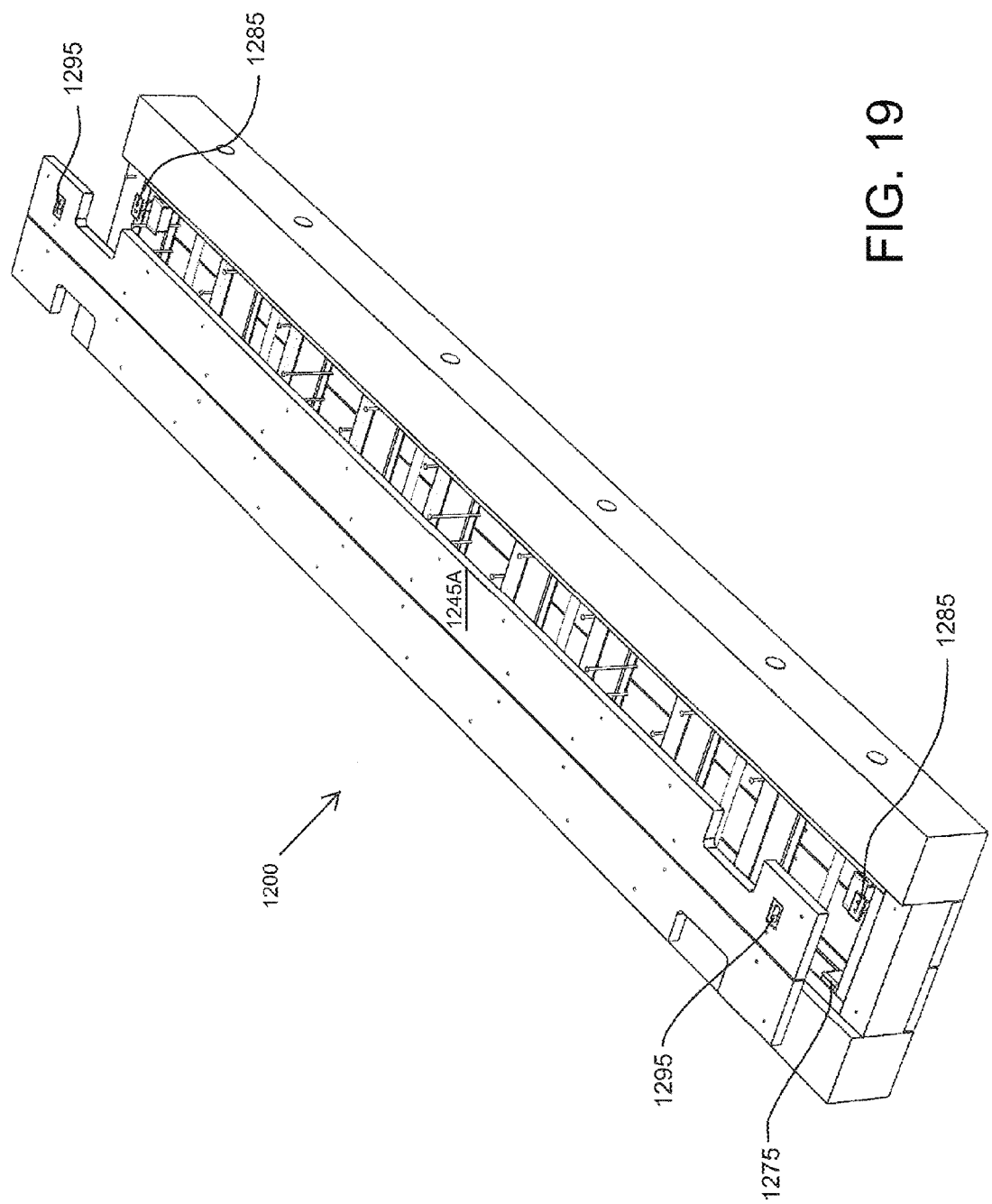
FIG. 19 is a view of certain peripheral components for the mats of the invention.

FIG. 19 illustrates a further variation of the invention, wherein mat 1200 includes a radio frequency identification (RFID) tag 1275 which is located in the core. Alternatively, this RFID tag 1275 can be embedded in an outer layer in an opening or a routered pocket to enable the mat to be monitored in an inventory system or when rented for use. The tag provides a unique identification serial number for each mat, such that the mats which are being used or rented can be tracked and accounted for as to location of use. The mats can be scanned when in a warehouse, when loaded on trucks for delivery, when delivered to a job site, or when collected from a jobsite after use. The RFID tags can be active or passive and if desired, other tracking devices such as barcodes could similarly be for the same purposes. It is preferred, however, that the RFID tag be embedded in the outer layers or core of the mat so that it is protected from damage during use. When a barcode or other surface mounted tag or indicia is used, it should be placed on a surface portion of the mat that is less likely to experience wear or abuse. Thus, the tag may preferably be applied onto the side of the mat so that it is not directed exposed to traffic on the mat. It also may be covered with a plexiglass film to prevent its removal by abrasion.

Figure 20:
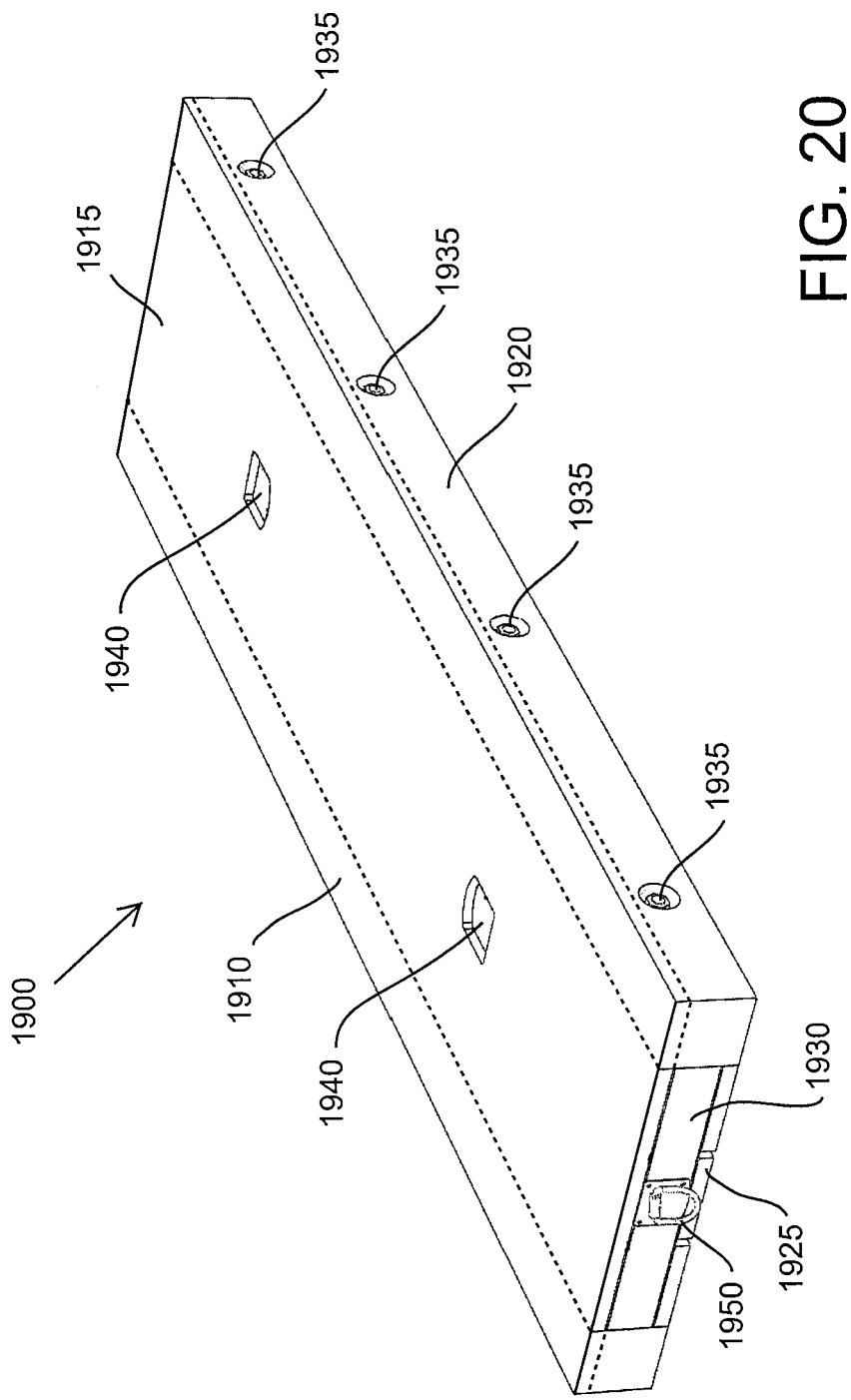
FIG. 20 is a perspective view of another crane mat according to the present invention.

FIG. 20 illustrates another embodiment in the form of a crane mat 1900 that has two side beams 1910, 1920, a box frame 1930, an upper layer of an elongated member in the form of a steel plate or a steel sheet 1915, and a lower layer also of an elongated member in the form of a steel plate or sheet 1925. And instead of a single plate or sheet, multiple plates or sheets can also be used if desired.

Two upper side lifting elements 1940 and a forward lifting element 1950 are provided. The upper side lifting elements are provide in a hole in the plate so that they can be attached directed to the box frame. The forward lifting element 1950 is attached directly to the front member 1930 of the box frame. If desired, a rear lifting element and two lower side lifting elements (not shown) can also be provided. These lifting elements allow the mat to be lifted overhead by a crane having a suitable lifting capacity to facilitate loading, unloading, and installing of the mats. The lifting elements 1940, 1950 can be constructed as disclosed in the other embodiments but preferably are in the shape of a D ring which is welded or bolted to the box frame 1930 or its cross members.

The side beams 1910, 1920 are joined to the box frame by bolting members 1935. This is done by tightening nuts onto the ends of the bolting members 1935 after they pass through the holes in the side beams. The side beam holes are recessed so that the bolting and nuts do not extend beyond the sides of the beams. The steel plates 1915, 1925 can be bolted to the box frame 1930.

And while the steel plates 1915, 1925 are shown as extending between the side beams 1910, 1920, in another embodiment, the side beams can be made shorter in height so that the plate members also cover the top and bottom surfaces of the beams. This is shown in FIG. 20 by the use of dotted lines.

To assist in the use of the mat during the night or on days that are dark due to poor weather conditions, the mat may include one or more lighting elements, such as those disclosed in International application WO 2006/048654. These lighting elements would preferably be embedded in the outer layer. FIG. 6 illustrates the locating of LED lights 1285 in the support structure beneath elongated member 1245A. The lighting is covered with a clear material 1295 of plexiglass, so that the lighting element may be better protected against damage during use. To achieve the desired lighting brightness, the skilled artisan can provide the necessary number of lighting elements, or can include lighting elements of larger size.

Another feature of the invention is the use of color coding to identify the specific layers that are used in the construction of the mat. This can also be used to identify mats for a particular customer or end user. When mats are rented or leased, the color coding can be used to identify which mats belong to the leasing company compared to mats provided by others. The color coding can be of a single color or of certain stripes, patterns, dots or other indicia that provides a "signature" that identifies the specific support structure that is present in the mat or a particular end user or owner of the mat.

The present invention provides unexpected benefits over the art in that the outer layer(s) can provide resistance to abrasion and abuse of the construction core while the core is resistant to moisture, water or even certain chemicals encountered from the surrounding environment. This enables the core to provide a much longer service life than when conventional wood components are used since the core is resistant to rotting or other chemical degradation that would otherwise affect wood components of the core. Finally, to the extent that any of the components of the upper or lower outer layers are damaged, they can be replaced so that a new mat can be made with the reuse of all of the support structure.

Therefore, in sum, it is to be realized that the optimum dimensional relationships for the parts of the invention can include variations and tolerances in size, materials, shape, form, function and use are deemed readily apparent and obvious to the skilled artisan, and all equivalent relationships to those illustrated in the drawings and described in the specification are intended to be encompassed by the claims appended hereto.

Unless defined otherwise, all technical and scientific terms used herein have same meaning as commonly understood by one of ordinary skill in the art to which this invention belongs. Also, as used herein and in the appended claims, the singular form "a", "and", and "the" include plural referents unless the context clearly dictates otherwise. All technical and scientific terms used herein have the same meaning.

The foregoing detailed description is considered as illustrative only of the principles of the invention. Further, since numerous modifications and changes will readily be apparent to those having ordinary skill in the art, it is not desired to limit the invention to the exact constructions demonstrated. Accordingly, all suitable modifications and equivalents may be resorted to falling within the scope of the invention.

What is claimed is:

1. An industrial mat comprising a supporting structure that is configured and arranged to provide strength and rigidity to the mat and to support other components of the mat; an upper layer provided above the supporting structure for forming an upper working surface of the mat, a lower layer provided below the supporting structure for providing a lower working surface of the mat; at least one opening provided in the mat; and one or more lifting elements attached to the supporting structure, with the lifting elements comprising D-shaped members, O-shaped members, U-shaped members, eyelets, hooks, circular or polygonal rings, chains, or cables that are configured and dimensioned for attachment to the supporting structure through an opening with sufficient strength to provide certified overhead lifting of the mat for installation and reclamation thereof; wherein the supporting structure includes at least two longitudinal members forming sides of the mat; and wherein the upper layer, lower layer or both or the upper and lower layers are independently made of a single metal plate or sheet that is configured and dimensioned to at least extend from one longitudinal member to the other to cover and protect the supporting structure; wherein each opening that is configured and dimensioned to hold and maintain the lifting element therein in a first retracted position below the working surface of the mat when not in use and to allow retrieval and removal of a portion of the lifting element from the opening to a second position that allows the lifting element to be connected to a hook or other lifting device when the mat is to be lifted or manipulated.

2. The mat of claim 1, wherein the lifting element is directly attached to a connecting member that is attached to the side longitudinal members of the supporting structure, wherein the connecting member comprises a plate, tube or rod, and the mat has a width of between about 4 and about 8 feet, a height of about 6 inches to about 24 inches and a length of between about 4 and about 60 feet.

3. The mat of claim 1, wherein the supporting structure comprises first and second longitudinal members of steel or a reinforced thermosetting resin that are joined together by a plurality of cross members to form a frame, with the lifting elements directly connected to the frame and wherein the single plate or sheet of the upper and/or lower layers are configured and dimensioned to also cover and protect the longitudinal members.

4. The mat of claim 3, wherein the lifting elements comprises D-, O- or U-shaped members or rings that are attached directly to a cross member of the supporting structure; or chains or cables that pass through openings in the upper or lower layers of the mat, with the openings optionally reinforced with collars which protect the openings from contact by the chains or cables and which adds stability as the mat is being hoisted or moved.

5. The mat of claim 1, wherein the lifting elements includes at least two lifting elements each located in an opening in the mat, each lifting element having a body with a first end thereof connected to one of: the upper or lower layers, the side longitudinal members, or to a connecting member that is attached to the side longitudinal members of the supporting structure, and a second end having grasping means for allowing a hook or connecting element of equipment to engage the grasping means for lifting and manipulation of the mat, with the mat including an opening configured and dimensioned to hold and maintain the lifting element therein in a first retracted position when not in use and to allow retrieval and removal of the second end of the lifting element from the opening to a second position that exposes the grasping means when the mat is to be lifted or manipulated.

6. The mat of claim 5, wherein the body of the lifting element is elongated and the first and second ends are arcuate to the second end to be removed from the opening, wherein the opening is sufficiently large to provide space around or access to the lifting element to allow a user to grab the second end to move it out of the opening.

7. The mat of claim 1 wherein the opening or openings are present in the plate or sheet and wherein the longitudinal members have width by height dimensions of between about 6 by 6 inches to about 24 by 24 inches and a length of between about 4 and about 60 feet, and are made of wood, engineered wood, or a thermosetting plastic material.

8. The mat of claim 7, wherein each opening associated with a lifting element is configured and dimensioned to hold and maintain the lifting element therein in a first retracted position in the opening when not in use and to allow retrieval and removal of the lifting element portion from the opening to a second position that exposes the lifting element portion when the mat is to be lifted or manipulated.

9. The mat of claim 8, wherein the supporting structure includes lateral rods that pass through the longitudinal beams, with each lifting element having a body with a first end thereof connected to a lateral rod, and a second end having the lifting element portion for allowing a hook or connecting element of equipment to be engaged with the lifting element portion when in the second position for lifting and manipulation of the mat.

10. The mat of claim 9, wherein the body of the lifting element is elongated and the first and second ends are arcuate to allow rotational movement of the second end about the lateral rod when the second end is to be rotated from the retracted position where the lifting element is oriented parallel to the beams to the second position where the lifting element is oriented perpendicular to the beams.

11. The mat of claim 1, further comprising a longitudinal side beam on each side of the supporting structure adjacent a longitudinal member, with the single plate or sheet of the upper and/or lower layers configured and dimensioned to also cover and protect upper and/or lower surfaces of the longitudinal side beams.

12. The mat of claim 11, wherein the longitudinal side beams have width by height dimensions of between about 6 by 6 inches to about 24 by 24 inches and a length of between about 4 and about 60 feet, and are made of wood, engineered wood, or a thermosetting plastic material.

13. An industrial mat comprising a supporting structure that is configured and arranged to provide strength and rigidity to the mat and to support other components of the mat; an upper layer provided above the supporting structure for forming an upper surface of the mat, or a lower layer provided below the supporting structure for providing a lower surface of the mat, or both of these first and second layers; and lifting elements attached to the upper layer, the lower layer or the supporting structure, with the lifting attached to the supporting structure or the upper or lower layer with sufficient strength to provide certified overhead lifting of the mat for installation and reclamation thereof; wherein the supporting structure includes at least two longitudinal members forming sides of the mat; and wherein upper and lower layers are independently made of a plate, sheet or plurality of elongated members, wherein the lifting elements includes one or two U-shaped members operatively associated with a rod that passes through the mat and that includes a plate attached thereto, with the lifting element including a spring between the plate and the U-shaped member and with the rod having a U-shaped member on one or each end, wherein when two U-shaped members are present, two springs are also present, one between each U-shaped member and the plate.

14. An industrial mat having substantially flat top and bottom surfaces and comprising:
  first and second side beams having top, side, and bottom surfaces, with the beams having width and height dimensions of between about 6×6 inches and about 24×24 inches and a length of between about 4 and 60 feet;
  a support structure located between and connecting the first and second side beams, with the support structure comprising first and second longitudinal members;
  wherein the side beams are attached to the support structure; and
  a mat lifting element associated with at least one opening in the mat to facilitate lifting or movement of the mat, the element comprising a D-shaped member, O-shaped member, U-shaped member, eyelet, hook, circular or polygonal ring, chains, or cables provided with sufficient strength to provide certified overhead lifting of the mat for installation and reclamation thereof;
  wherein the support structure includes:
    a first layer of a plurality of elongated members attached to an upper portion of the support structure to form the top surface of the mat, or a second layer of a plurality of elongated members attached to a lower portion of the support structure to form the bottom surface of the mat, or both of these first and second layers;
    each opening is present in one of the first or second elongated members or between two of such members and is configured and dimensioned to provide a minimum of open space and the one or more openings in the elongated members includes:
      one opening in each of two elongated members;
      one opening in each of four elongated members;
      one opening in each elongated member;
      two openings in one elongated member;
      two openings in each of two elongated members;
      two openings in each of four elongated members; or
      two openings in each elongated member.

15. The mat of claim 14, wherein a lifting element is provided within each opening, and each lifting element comprises a chain link, part of a cable, a connector ring; an eyelet, a hook, a D-shaped member, a U-shaped member, or a circular or polygonal ring.

16. The mat of claim 15, wherein the lifting element is a D- or U-shaped member or a ring that is attached directly to the support structure or that is operatively associated with a connecting member of a plate or tube that is attached to the support structure.

17. The mat of claim 14, wherein each opening includes a collar which protects the opening from contacting a lifting element and which adds stability the mat is being hoisted or moved.

18. The mat of claim 14, wherein each opening associated with a lifting element is configured and dimensioned to hold and maintain the lifting element therein in a first retracted position when not in use and to allow retrieval and removal of the lifting element portion from the opening to a second position that exposes the lifting element portion when the mat is to be lifted or manipulated.

19. The mat of claim 14, wherein the openings for the lifting element or elements are spaced about 1 to 3 feet from the front or rear ends of the mat.

20. The mat of claim 18, wherein the supporting structure includes lateral rods that pass through the longitudinal beams, with each lifting element having a body with a first end thereof connected to a lateral rod, and a second end having the lifting element portion for allowing a hook or connecting element of equipment to be engaged with the lifting element portion when in the second position for lifting and manipulation of the mat.

* * * * *